(12) United States Patent
Wengrovitz et al.

(10) Patent No.: US 7,672,294 B2
(45) Date of Patent: Mar. 2, 2010

(54) METHODS AND DEVICES FOR ACHIEVING PARALLEL OPERATION BETWEEN IP AND ANALOG PHONES

(75) Inventors: Michael S. Wengrovitz, Concord, MA (US); Andrew Nelson, Earlwood (AU)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1521 days.

(21) Appl. No.: 10/956,204

(22) Filed: Sep. 30, 2004

(65) Prior Publication Data

US 2006/0067302 A1      Mar. 30, 2006

(51) Int. Cl.
*H04L 12/66* (2006.01)
(52) U.S. Cl. .................. 370/352; 370/356; 379/202.01; 709/205
(58) Field of Classification Search .................. 370/260, 370/352, 325, 356; 375/222, 231; 455/344; 709/228, 205; 379/202.01
See application file for complete search history.

(56) References Cited

U.S. PATENT DOCUMENTS

| | | | |
|---|---|---|---|
| 6,345,047 B1 * | 2/2002 | Regnier | 370/352 |
| 6,430,219 B1 * | 8/2002 | Zuranski et al. | 375/231 |
| 6,654,455 B1 | 11/2003 | Isaka | |
| 7,133,514 B1 * | 11/2006 | Cook et al. | 379/202.01 |
| 7,133,896 B2 * | 11/2006 | Ogdon et al. | 709/205 |
| 7,224,672 B2 * | 5/2007 | Arai | 370/252 |
| 7,301,940 B1 * | 11/2007 | Bernstein | 370/356 |
| 7,391,764 B2 * | 6/2008 | Chaplik et al. | 370/352 |
| 2002/0164003 A1 | 11/2002 | Chang et al. | |
| 2004/0148405 A1 * | 7/2004 | Nakamoto | 709/228 |
| 2004/0192248 A1 * | 9/2004 | Chen | 455/344 |
| 2005/0068906 A1 * | 3/2005 | Muri | 370/260 |
| 2007/0189266 A1 * | 8/2007 | Izumi et al. | 370/352 |

FOREIGN PATENT DOCUMENTS

WO       WO 03/009529 A2     1/2003

\* cited by examiner

*Primary Examiner*—Gerald Gauthier
(74) *Attorney, Agent, or Firm*—Garlick Harrison & Markison

(57) ABSTRACT

An IP bridge phone for operatively coupling one or more analog phones to a digital communications network to support parallel communications is disclosed. The IP bridge phone includes a phone handset interface adapted to connect to a phone handset, an analog phone interface, and a network interface. A mixing module is adapted to receive a first voice signal from the handset interface, a second voice signal from the analog phone, and a third voice signal from the data communications network; generate a plurality of combined signals from the first voice signal, the second voice signal, and the third voice signal; and transmit each of the plurality of combined signals to one of the plurality of interfaces. The plurality of combined signals provide parallel communications between the phone handset, the analog phone, and the remote calling party.

32 Claims, 28 Drawing Sheets

METHODS AND DEVICES FOR ACHIEVING PARALLEL OPERATION BETWEEN IP AND ANALOG PHONES

FIELD OF INVENTION

The present invention generally relates to a mechanism that integrates analog telephone systems with data networks. In particular, the invention relates to an apparatus and method for operatively coupling one or more analog phones to one or more IP phones in order to support parallel communications.

BACKGROUND

There are numerous residential and commercial environments having phones wired in parallel. In this familiar mode of operation, each of the phones rings in response to an incoming call, each of the phones may be used to answer the incoming call, and each of the phones may concurrently participate in an ongoing call by simply going off-hook. As illustrated in FIG. 1, a telephone system includes a plurality of conventional analog phones 120, 121 with handsets 130, 131 that may be wired in parallel directly to the Public Switch Telephone Network (PSTN) 100 or indirectly via a Private Branch Exchange (PBX) 110 or comparable server system and communications links 152, 154, 155 with conductor pairs commonly known as tip and ring lines. In a hotel, for example, the PBX (a) facilitates sharing of particular number of PSTN trunks with a relatively larger number of guest lines or phones, (b) supports room-to-room calling without involving the public network, (c) tracks phone usage so that guests may be billed for their telephone usage, and (d) enables/disables phone operation upon guest check-in/check-out from a room.

Illustrated in FIG. 2 is a typical sequence diagram for two analog telephone phones operating in parallel, although the operation applies more generally to three or more analog phones coupled in parallel. When an incoming call request, e.g., RING signal 202, 204, originating from the PBX 110 or PSTN, for example, arrives at and is answered by a first phone, an off-hook signal 206-207 is sent back to the PBX 110. Telephone voice signals 210-212 and subsequently transmitted between the PBX or PSTN and between the phone and associated phone handset 130. If a second phone 121 sharing a common tip and ring lines with the first 120 is off-hooked 216 during the ongoing conversation, audio signals are also exchanged between the second analog phone and its associated handset 131. If the first telephone 120 on-hooks before the second analog phone 121, the first handset voice signal 222 and the voice signals 228, 230 continue to be exchanged with the second telephone handset even though the first phone initially answered the call. Eventually the second phone 121 on-hooks 232 and the call is terminated.

With the rapid onset of Internet Protocol (IP) telephony into the marketplace, commercial institutions including hotels are motivated to upgrade existing analog telephone systems with IP telephones to enhance functionality and services not available with analog phones systems. With IP telephony operating data lines, hotel guests may be provided Internet access, caller-ID display, text message delivery, setup of wake-up calls, room service, account status, automatic checkout, and the like. In a number of instances, however, it is desirable for the hotels to replace some but not all guest analog phones with IP phones. For example, a hotel may wish to replace the analog phone at a hotel room's desktop with an IP phone while retaining the legacy analog phone commonly situated at the side of one or more beds as well as those analog phones at or near a bathroom.

While private branch exchange (PBX) systems have been adapted to support both IP and analog phones, there is currently no way to operate an IP phone and analog phone in parallel. Therefore, there is a need for a system and method to efficiently and cost effectively operatively couple IP and analog phones for paralleled voice communications.

SUMMARY

The present invention features an IP bridge phone, referred to without loss of generality as a SIP bridge phone (SBP) operatively coupled to a data communications network. The first preferred embodiment of the IP bridge phone comprises a plurality of interfaces including a phone handset interface adapted to connect to a phone handset, an analog phone interface adapted to connect to at least one analog phone or phone with analog connection, a network interface adapted to connect to the data communications network; and a mixing module. The mixing module is adapted to receive a first voice signal from the handset interface, a second voice signal from the analog phone, and a third voice signal from the data communications network; generate a plurality of combined signals from the first voice signal, the second voice signal, and the third voice signal; and transmit each of the plurality of combined signals to one of the plurality of interfaces. The plurality of combined signals provide parallel communications between the phone handset, the at least one analog phone, and a remote party.

The phone handset interface is preferably adapted to transmit and receive handset voice while the analog phone interface preferably includes a standard RJ-11 telephone jack and Subscriber Line Interface Circuit (SLIC) for performing ring generation, off-hook detection, and on-hook detection, for example. The network interface, preferably an Ethernet port, is adapted to exchange packetized voice data using Real-Time Protocol (RTP) and Voice-over-IP protocol including Session Initiation Protocol (SIP), for example.

In some embodiments, the SBP further includes a wireless adaptor to connect to a wireless access point in the data communications network, or a user's computing device, for example. In some embodiments, the SBP is integrated in a proxy server for remotely interacting with a SIP phone and an analog phone via a conventional SIP-to-phone media gateway, for example. The SBP may also be implemented in the form of a module that is operatively integrated into a VoIP handset, a VoIP media gateway, or an IP-PBX.

BRIEF DESCRIPTION OF THE DRAWINGS

The present invention is illustrated by way of example and not limitation in the figures of the accompanying drawings, and in which.

DETAILED DESCRIPTION

Figure 1:
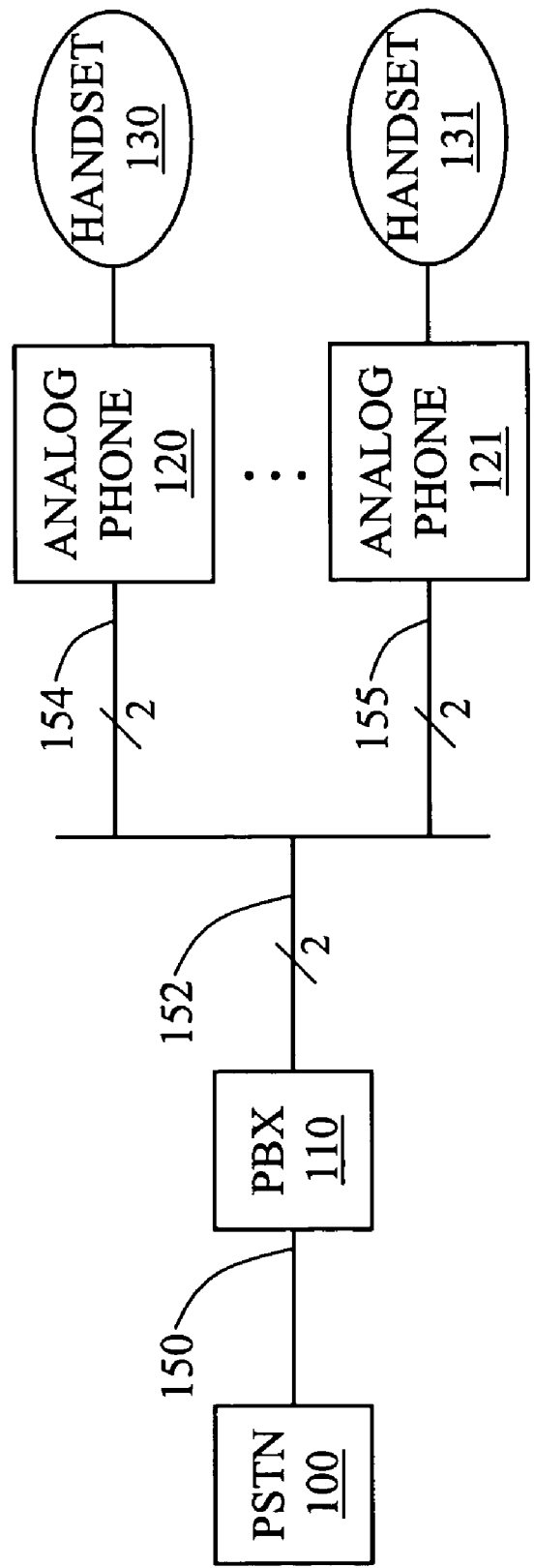
FIG. 1 is a telephone system comprising a plurality of analog phones operatively coupled in parallel, according to the prior art.
Figure 2:
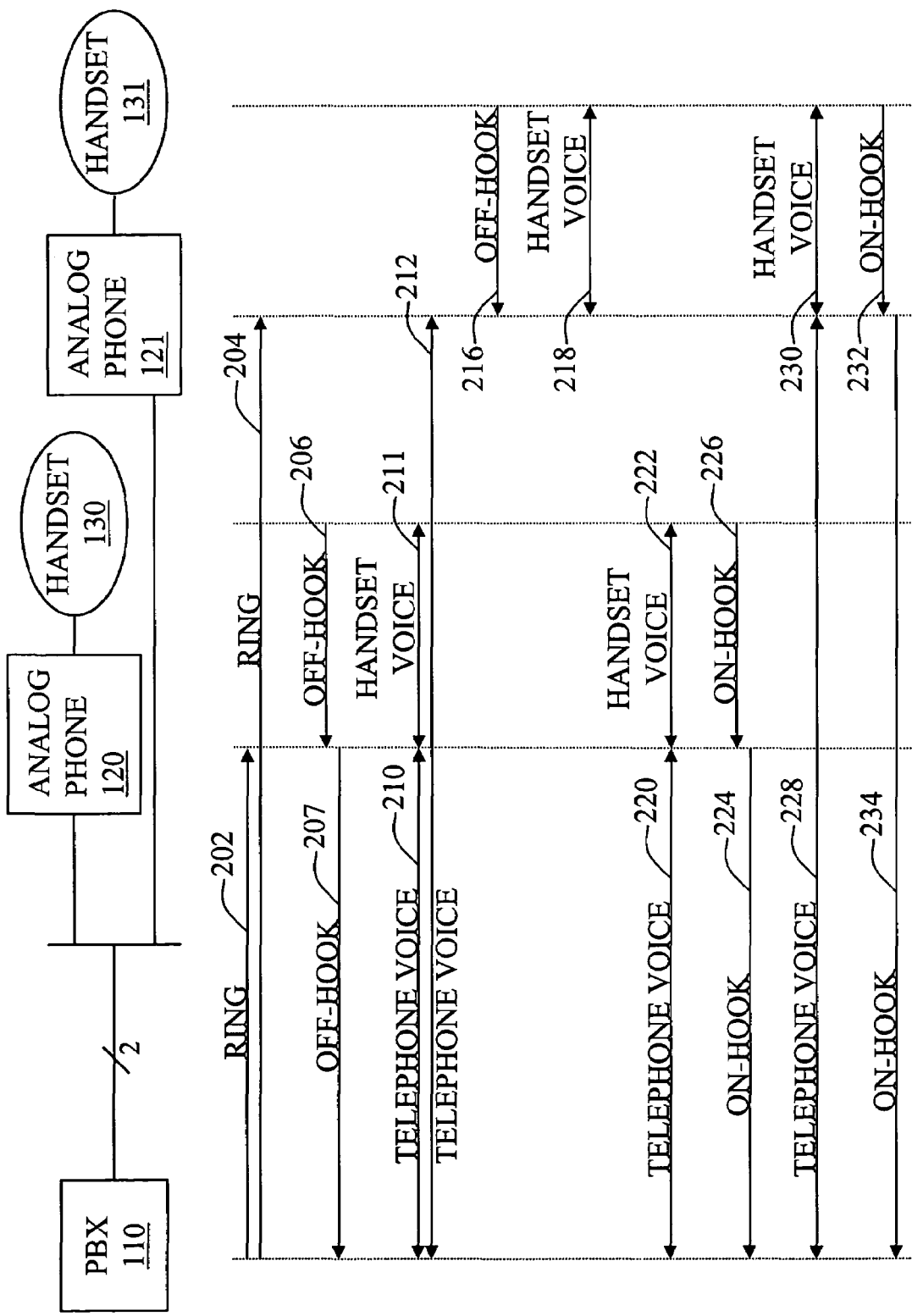
FIG. 2 is a sequence diagram depicting the parallel operation of analog phones operatively coupled in parallel, according to the prior art.
Figure 3:
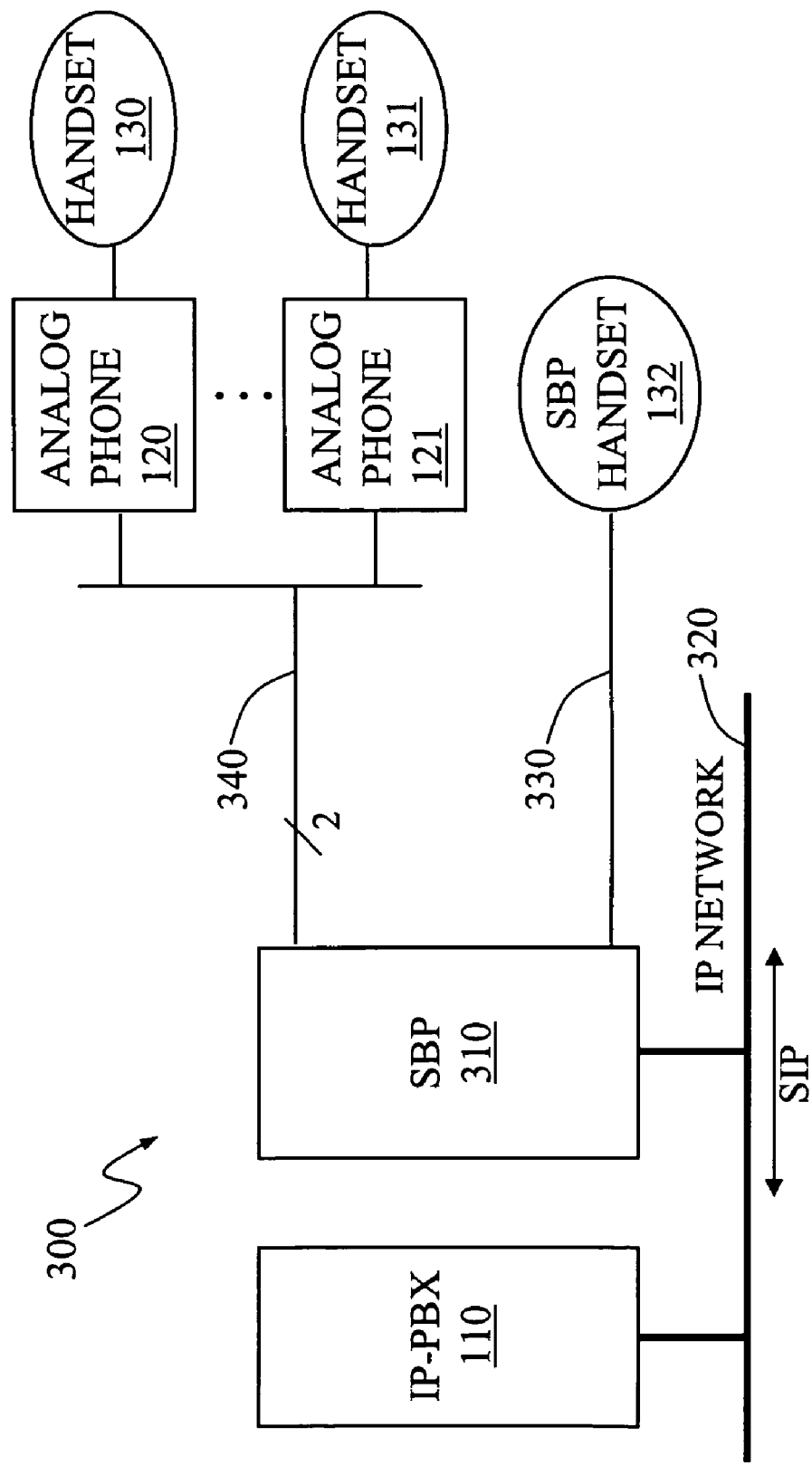
FIG. 3 is a SIP bridge phone (SBP) for operatively coupling analog and packetized audio interfaces for parallel voice communications, according to the preferred embodiment of the present invention.

Illustrated in FIG. 3 is a SIP bridge phone (SBP) for operatively coupling analog and packetized voice interfaces for parallel voice communications. Packetized voice is exchanged between the SBP 310 and a network server, e.g., an IP-PBX 110 or PSTN gateway, via a data communications network 320. The data communications network 320 is preferably an IP network that supports a voice-over-IP (VoIP) protocol such as Session Initiation Protocol (SIP) or H.323.

In addition to the communications network 320, the SBP 310 includes an audio user interface adapted to operatively couple to one or more wired or wireless handsets 132 and or one or more wired or wireless audio headsets via a first port and communications link 330. The audio user interface in this and other embodiments may include a speaker and microphone, either of which may be integrally incorporated into the SBP 310 with or without the SPB handset 132 or headset. The communications link 330 in the preferred embodiment is a standard telephone cord line for transmitting analog handset microphone and earpiece signals. The SBP 310 may further include a tactile user interface (TUI) with a keypad for dialing calls and a graphical user interface (GUI) for display time, date, and caller identification, for example.

The SBP 310 in the preferred embodiment is also operatively coupled to one or more analog phones 120, 121 wired in parallel via a second communications link 340. The second communications link 340 is preferably a standard two-conductor telephone cable or extension for exchanging voice signals with analog phones 120, 121, e.g., plain old telephone service (POTS) phones, with respective handsets 130, 131. In the preferred embodiment, the SBP 310 is enabled with a Foreign Exchange Service (FXS) connection that provides for the generation of ring signals, detection of analog phone off-hook/on-hook, and selection of telephone voice levels as needed by the analog phone user. The term "analog phone" herein refers to a phone with an analog connection to the telephone network, which may include wired and wireless phones with analog or digital communications links between the phone base and the associated phone handset or headset, for example.

In addition to supporting voice communication between the IP network 320 and the analog phones 120-121, and SPB handset 132, the SBP 310 of the preferred embodiment performs real-time media conversion between the packetized digital voice on the IP network 320 and the continuous-time analog voice to/from the SBP handset 132 and to/from one or more analog phones 120, 121. When a call involves a party reachable remotely through the IP network 320, the SBP 310 can simultaneously receive audio from the remote party, the SBP handset 132, and the one or more analog phones 120-121, then mix the audio, and subsequently retransmit the combined signals so that each party can hear every other party. In this manner, the SBP 310 provides for the parallel operation between the one or more analog phones 120, 121 and the SBP handset 132.

One skilled in the art will appreciate that the SBP 310 can provide a transparent connection between the analog phones 120-121 without a direct connection to the IP-PBX 110 or PSTN 100. Further, from the perspective of the IP-PBX or SIP-PSTN service, the SBP 310 maintains the appearance of a single SIP user agent client and conceals the presence of the two types of parallel clients, namely the analog-based phones 120-121 and an IP-based phone provided by the SBP 310 together with SBP handset 132.

Figure 4A:
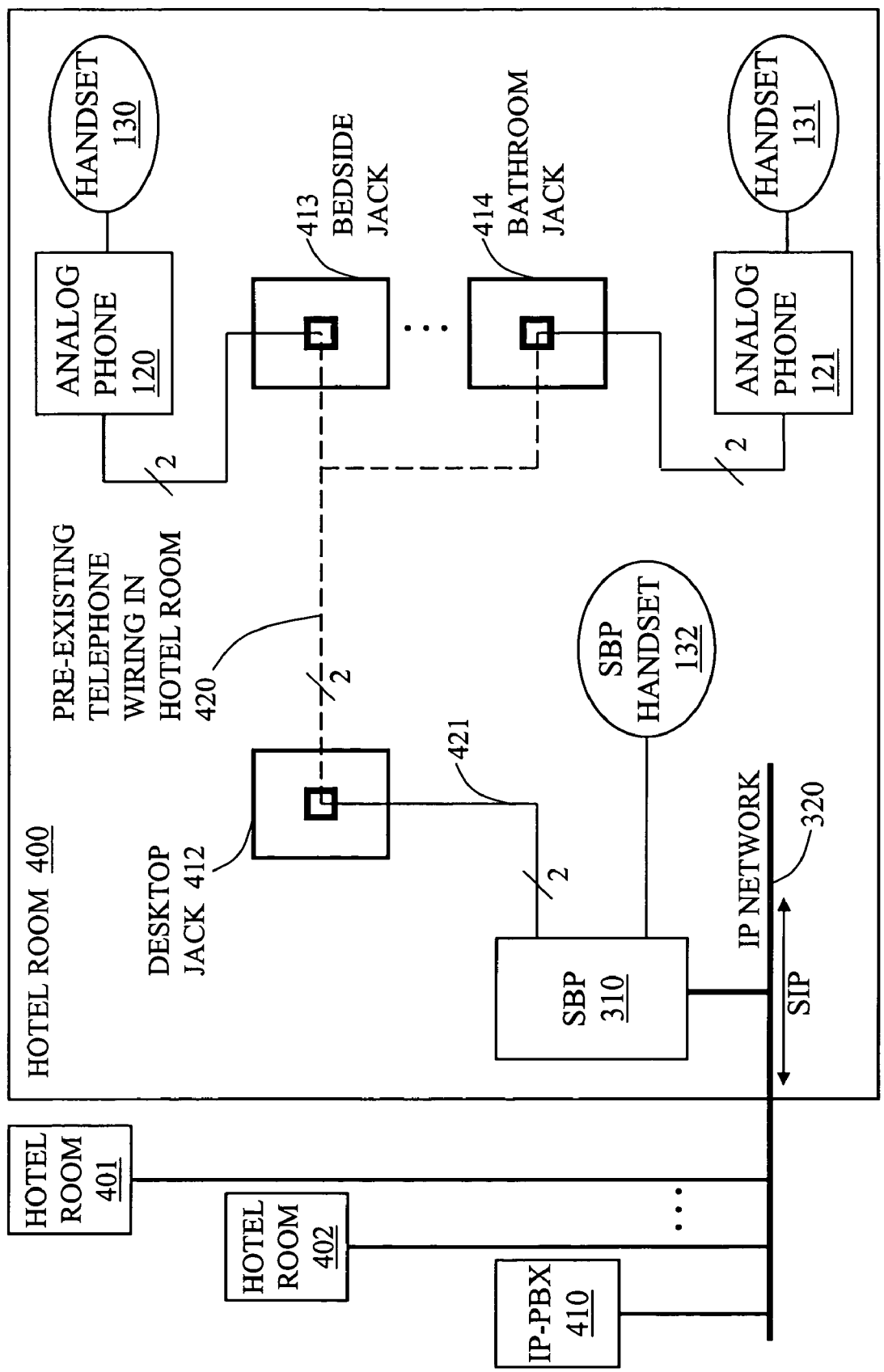
FIG. 4A is a typical telephone installation including an SBP configured to provide parallel telephone connectivity between the SBP handset 132 and a plurality of analog phones using the pre-existing telephone infrastructure present in a hotel, residence, or other building, according to the preferred embodiment of the present invention.

Illustrated in FIG. 4A is a typical telephone installation including an SBP configured to provide parallel telephone connectivity between the SBP handset 132 and a plurality of analog phones using the pre-existing telephone infrastructure present in a hotel, residence, or other building. A hotel, for example, may possess an IP-PBX 410 operably coupled to a plurality of hotel rooms 400-402 via the data communications network 320. In each of the hotel room 400, the telephone installation generally includes a plurality of telephone jacks 412-414 operatively coupled by telephone wiring 420 which may include pre-existing wire installed during construction of the hotel. The plurality of jacks typically include a first wall-mounted jack 412 intended to service a phone at a desktop, a second wall-mounted jack intended to service a phone at or between beds, and a third telephone jack in proximity to a bathroom. When deployed in a hotel, for example, the SBP 310 may replace the desktop analog phone and couple to the desktop telephone jack 412, thus providing the SBP access to the other analog phones in the hotel room.

When a call involves a remote party, the SBP 310 is configured to receive voice signals from the IP network 320, which are then processed and the audio signals transmitted to the SBP handset 132 and/or to at least one analog phone 120-121 via a connection through the room's wiring 420. Voice signals generated at the SBP handset 132 are conveyed to the SBP 310 and the corresponding packetized voice data is transmitted to the IP network 320. In order to provide the parallel connection between the SBP phone operating in the IP domain and analog domain, the SBP 310 also generates a combined voice signal including the voice signals from the SBP handset 132 and the remote caller, which is then transmitted to at least one analog phone 120-121. Similarly, analog voice signals generated by any of the analog phones 411, 412 are conveyed to the SBP handset 132 and incorporated into the packetized voice transmitted to the remote party accessible through the IP network 320. In this manner, the SBP 310 may be operated in parallel with one or more existing phones accessible through the hotel telephone infrastructure. One skilled in the art will appreciate that a hotel guest may therefore have access to hotel services provided by the IP-PBX 410 using analog phones with no direct analog connection between the phones and the IP-PBX 410.

In addition to a hotel room, an SBP 310 may be used in residential installation to exploit an existing telephone infrastructure and couple analog phones to the PSTN via an Internet connection or other broadband service. The SBP could provide any phones connection to the existing residential telephone wiring—including those in a kitchen, bedrooms, and living room—with access to the PSTN via an IP network without replacing each of the existing phones. One skilled in the art will appreciate the connection to the PSTN is purely IP and does not rely on any direct analog connection between the phones and the PSTN.

Figure 4B:
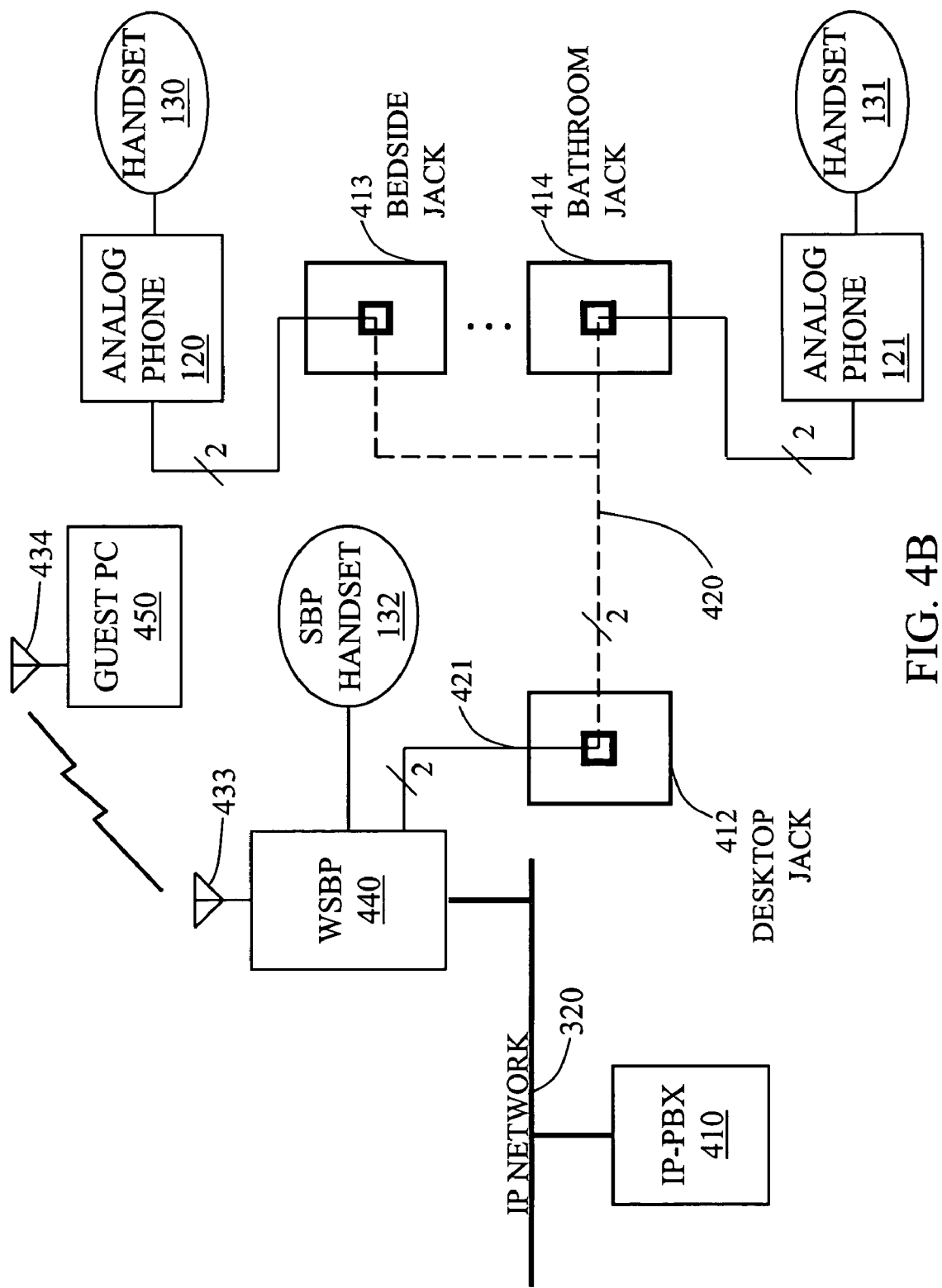
FIG. 4B is a typical hotel telephone installation including a wireless SBP (WSBP) for operatively linking a SBP handset and plurality of analog phones, according to the preferred embodiment of the present invention.

Illustrated in FIG. 4B is a typical hotel telephone installation including a wireless SBP (WSBP) for operatively linking a SBP handset and plurality of analog phones. In this embodiment, the SBP 440 includes a wireless interface connected to the IP-PBX 410 via the data communications network 320. The WSBP 440 therefore serves as a wireless access point adapted to provide network connectivity for a guest's computing device 450 or other access point client enabled with one or more wireless transmission protocols including Institute of Electrical and Electronics Engineers, Inc., (IEEE) standard 802.11a, 802.11b, 802.11g, or Bluetooth, for example. This embodiment may be adapted to provide wireless Internet in each room as a convenience to the guest, and also minimizes cost associated with installation of other dedicated wireless access points throughout the hotel. The WSBP 440 may further include one or more hard-wired network ports (not shown) providing wired connectivity for guest computers that are unable to make the wireless connection with the WSBP.

In some embodiments, the WSBP 440 is further adapted to serve as a network relay providing guests' wireless devices access to the hotel's local area network (LAN) and the Internet more generally. The WSBP 440 and a personal computer (PC) 450, for example, interoperate via the PC's antenna 434 using any of wireless protocols as discussed above.

Figure 4C:
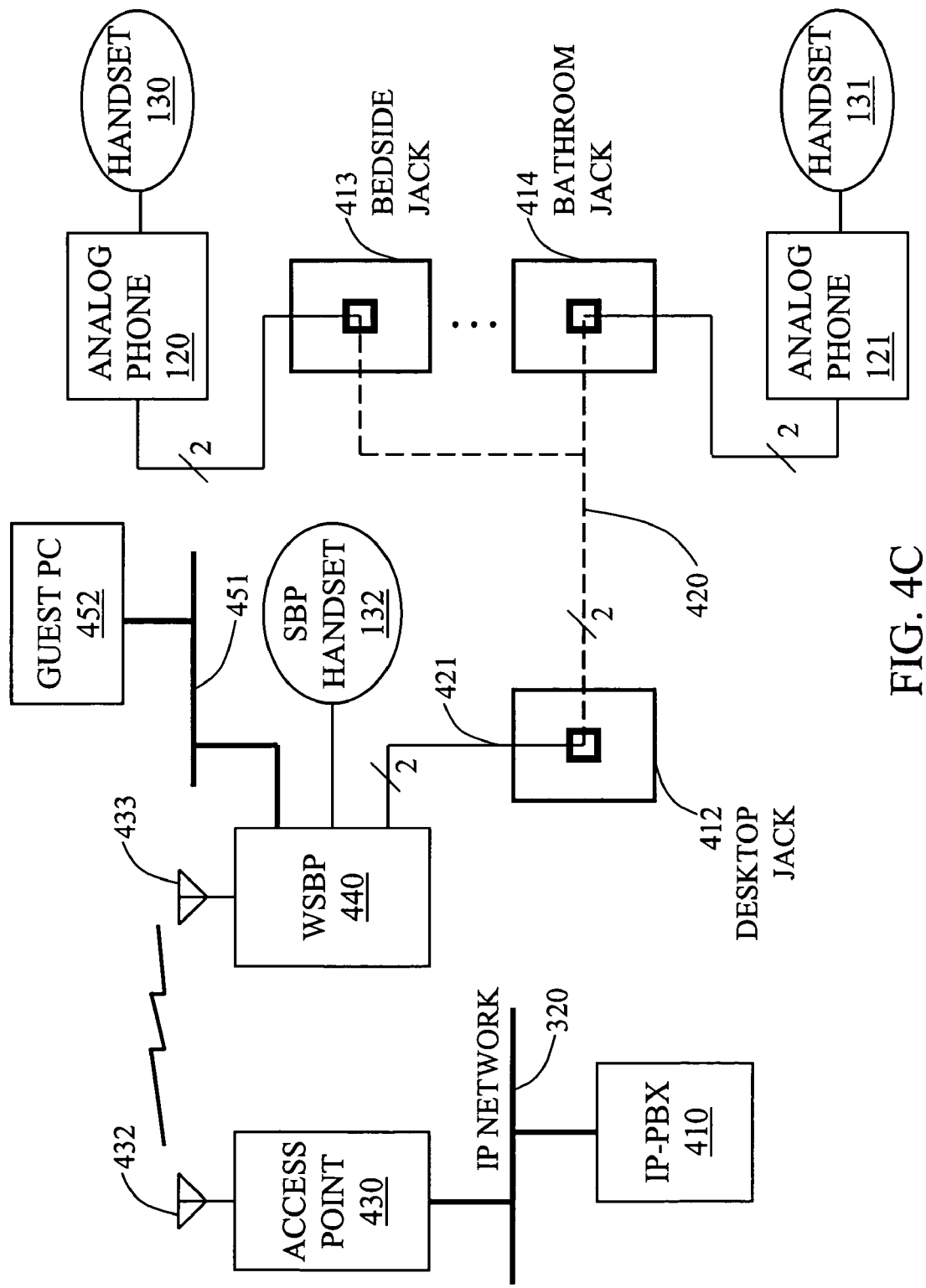
FIG. 4C is a WSBP integrated into a typical hotel telephone installation including plurality of analog phones, according to the preferred embodiment of the present invention.

In the alternative to a wireless connection, a physical communications link may be used to operably couple the WSCP 440 with the guest data appliance 452. As illustrated in FIG. 4C, the WSBP 440 may further include one or more data ports into which the guest's data appliance 452 directly couples or indirectly couples via a local data communications network 451. In the preferred embodiment, the data port is an Ethernet port that is compliant with IEEE 802.3. As described above, the WSBP 440 may be configured as a data hub that relays signals between the access point 430 and the guest data appliance 452, thereby giving the guest access to the hotel's LAN and or the Internet. Using this wired connection to the guest data appliance 452, a hotel guest may conveniently access the hotel's network and Internet by simply plugging in an Ethernet cable between the PC 452 and the WSBP 440. One skilled in the art will appreciate that such a WSBP 440 would eliminate the need to install additional data network wiring to each room while simultaneously providing connectivity for the one or more analog phones.

In the residential application, the WSBP may be located anywhere within the home including the kitchen, study, or bedroom, for example. The WBSP may be tap into the residential telephone wiring via an existing telephone jack and connect to a data network via a broadband cable modem or Digital Subscriber Line (DSL), for example. As described above, the WBSP may also provide wireless connectivity to other wireless clients in the home including PCs, laptops and wireless appliances without the need for a dedicated wireless access point.

In still other embodiments, the WSBP 440 is adapted to operate in either of two configurable modes: (a) an Access Point Client Mode in which the connection of the WSBP 440 to the hotel's or home's data communications network 320 occurs wirelessly while a connection to a guest's personal computing device 450 occurs in a wired fashion, or (b) an Access Point Mode in which the connection of the WSBP 440 to the hotel's data communications network 320 is a wired connection while the connection to a guest's personal data appliance is wireless.

Figure 5:
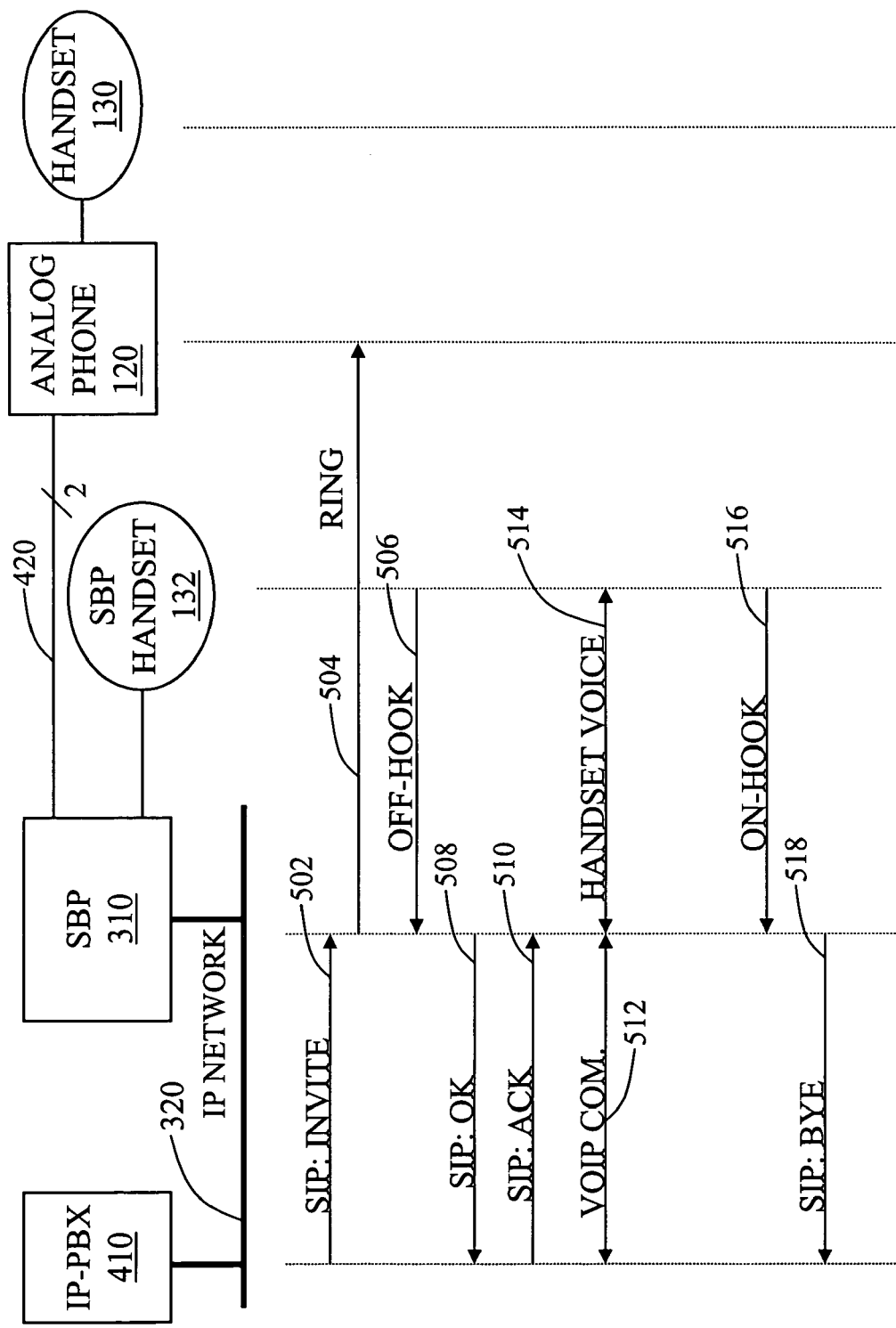
FIG. 5 is a sequence diagram of an SBP response to an incoming call answered at the associated handset, according to the preferred embodiment of the present invention.

Illustrated in FIG. 5 is a sequence diagram of an SBP response to an incoming call from a remote party that is answered at the SBP handset. In this example, the call is received over the data communications network 320 from the IP-PBX 410, although the call may also originate from the user's SIP-PSTN service or elsewhere in the network. In response to the incoming call, the SBP 310 itself rings and a ring signal is also conveyed to one or more analog phones operatively coupled to the SBP 310 for parallel communications. Note also that in the following examples below, the telephonic connection between the SBP 310 and the one or more analog phones is illustrated as a direct point-to-point connection for simplicity. One skilled in the art, however, will appreciate that the actual wiring deployment will generally include one or more distribution frames and connection blocks within the hotel or residence.

In the preferred embodiment, the IP-PBX 410 is a SIP-enabled PBX and the incoming call is a packet-domain connection request, i.e. a session request in the form of a SIP: INVITE message 502. SIP is preferable because it is a widely-accepted protocol, although various other IP and voice-over-IP (VoIP) protocols may also be employed. Upon receipt of the SIP: INVITE message 502, the SBP 310 rings and an analog ring signal 504 sent from the SBP 310 to each of the one or more analog phones 120 via the hotel's wiring 420 or a direct connection.

If the call is answered at the SBP 310, the SBP receives an off-hook signal 506 from the SBP handset 132 and sends a session acceptance message, preferably a SIP:OK message 508, back to the Universal Resource Locator (URL) address in SIP:INVITE message 502. The SBP 310 also receives a SIP:ACK message 510 from the caller to confirm the session setup. The subsequent Voice-over-IP (VoIP) communications 512 between the caller and the user generally include a media exchange based on Real-Time Transport Protocol (RTP) or alternative protocol. Voice communications 514 between the SBP 310 and the handset 132 are based on conventional analog signals in the preferred embodiment. At the end of the conversation, the SBP handset 132 goes on-hook and the on-hook signal 516 transmitted to the caller in the form of a SIP:BYE 518 automatically generated by the SBP 310.

In some embodiments, the SBP 310 includes port selection parameter, configurable via a browser-based or management interface, that permits a user to select which ports to include and exclude from the conversation. For example, the user may opt to disable the SBP handset 132 and have all incoming calls directed to the one or more analog phones 120 and prevent the SBP 310 from ringing. In this manner, the user may choose either the SBP 310 to ring, the analog phone 120 to ring, or both.

Figure 6:
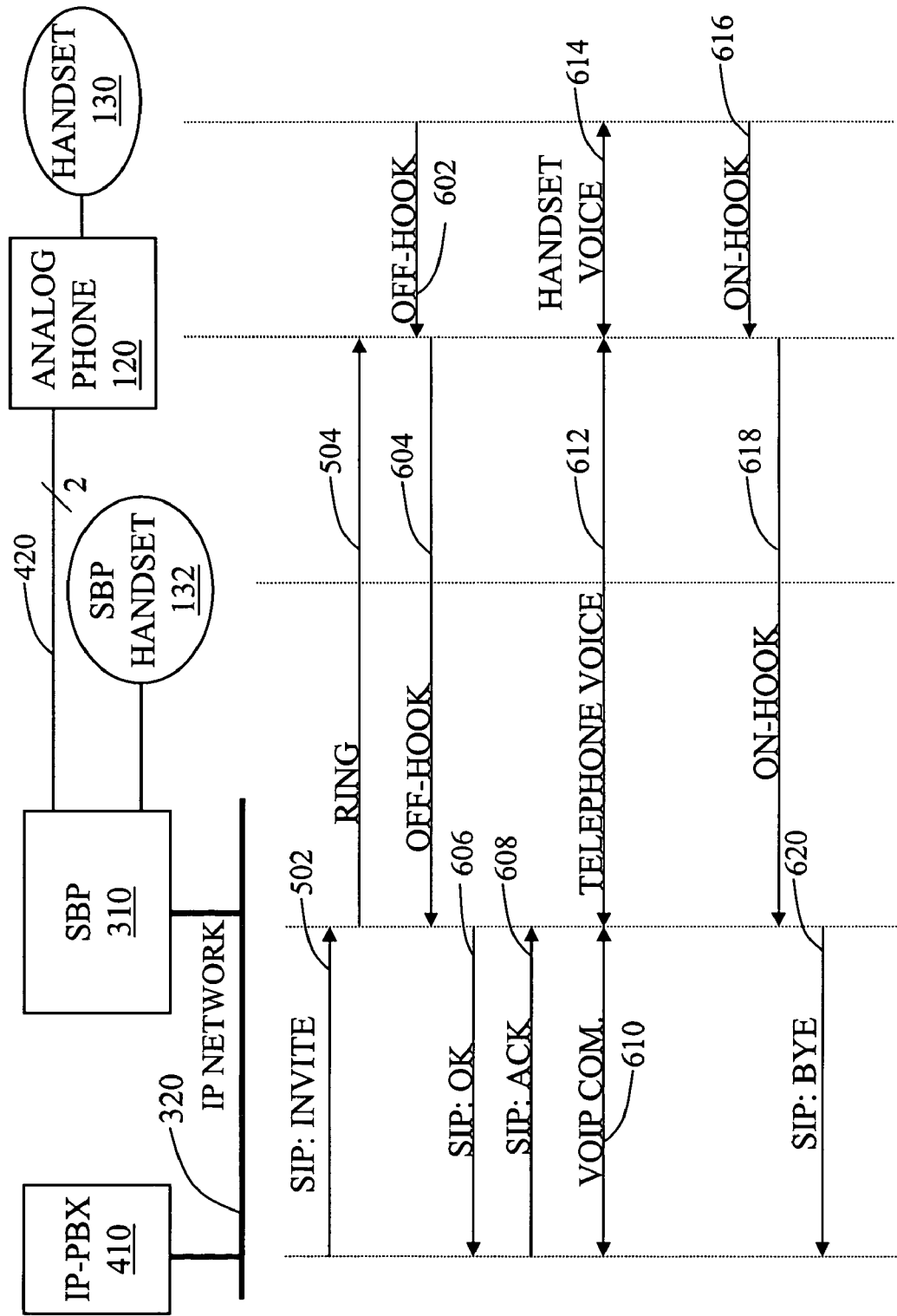
FIG. 6 is a sequence diagram of an SBP response to an incoming call answered at an analog phone, according to the preferred embodiment of the present invention.

Illustrated in FIG. 6 is a sequence diagram of an SBP response to an incoming call answered at an analog phone. Upon receipt of the incoming call, preferably a SIP: INVITE message 502, the SBP 310 alerts with a ring and a ring signal 504 is also transmitted to the one or more analog phones represented by phone 120. If the call is answered at any of the one or more analog phones 120, an off-hook signal 602 from the analog phone handset 130 is transmitted to the SBP 310 which, in turn, automatically generates and sends a session acceptance, preferably a SIP:OK message 606, to the caller at the URL address in SIP:INVITE message 606. The SBP 310 also receives a SIP:ACK message 608 from the caller to confirm that the session was established successfully.

The subsequent Voice-over-IP (VoIP) communications 610 between the caller and the user at the analog phone 120 generally include an RTP media exchange via the SBP 310. Voice communications 514 between the SBP 310 and one or more analog phones 120 are conventional analog telephone signals. The SBP 310 is adapted to perform translation of voice signals between the packet domain 320 and analog domain 420 in real-time. The user at the analog phone handset 130 subsequently terminates the call by going on-hook which causes an on-hook signal 616 to be transmitted to the SBP 310. The SBP 310, in turn, automatically transmits the on-hook 618 to the caller in the form of a session termination message, preferably SIP:BYE message 620.

If the SIP call is terminated by the calling party by means of a SIP: BYE signal transmitted to the SBP 310, the VoIP media exchange between the SBP and the caller is terminated. In order to signal the user at the analog phone that the session has been terminated by the remote party the SBP 310 in the preferred embodiment is adapted to transmit a signal including a period of silence followed by a busy signal.

As discussed in more detail in reference to FIGS. 7A, 7B, 8A, and 8B, the SBP 310 in the preferred embodiment is adapted to enable: (1) an incoming SIP call can be initially answered by either the SBP with the associated handset or by an analog phone attached to it, (2) users at both the SBP phone and one or more analog phones to participate in the session with the caller and to hear one another, (3) keep a session open while the SBP handset 132 or any of the analog phones 120 is off-hook, and (4) terminate the session when the SBP handset and one or more analog phones are all on-hook.

Figure 7A:
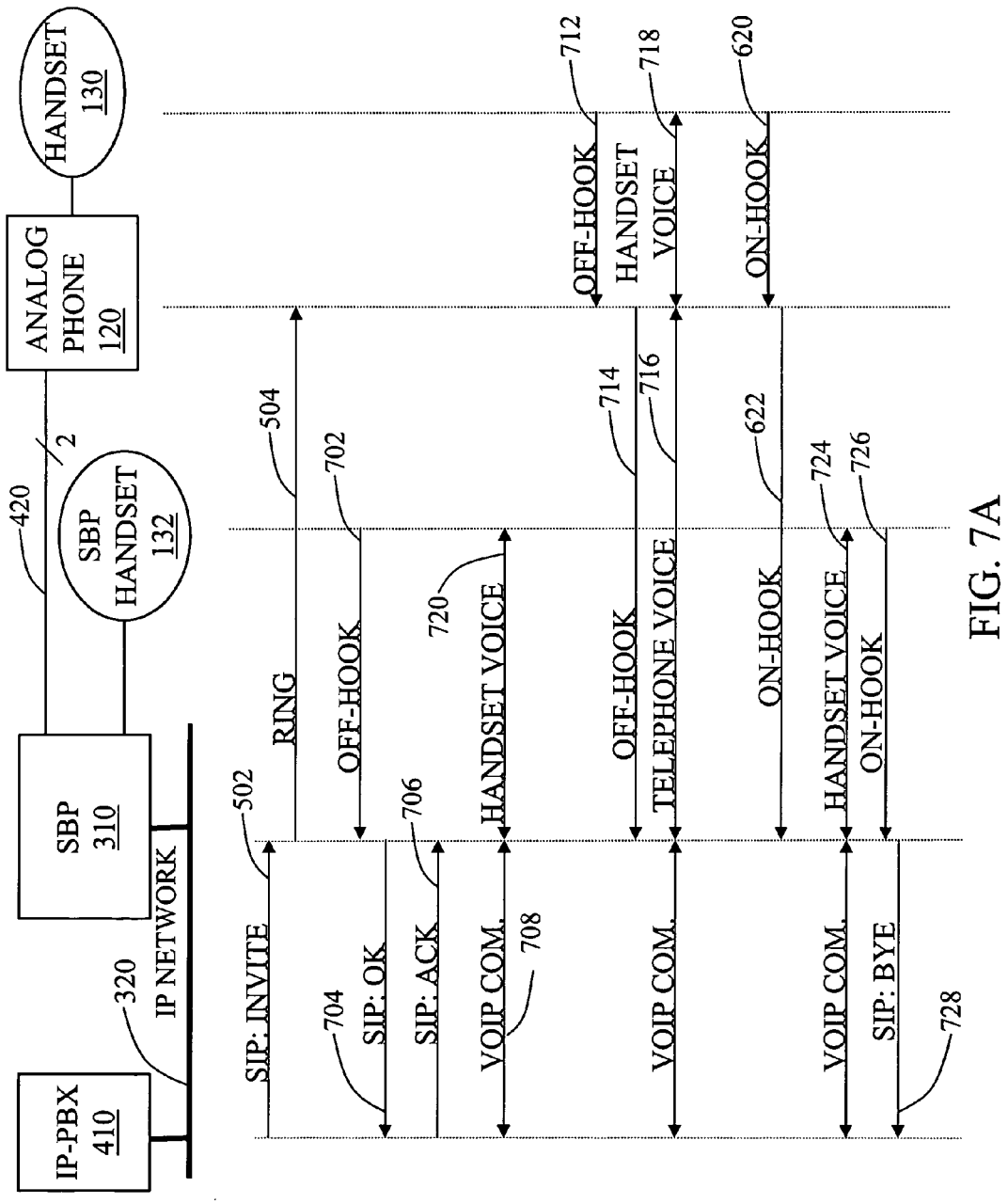
FIG. 7A is a sequence diagram of the response of the SBP to an incoming call in which the SBP handset is the first to answer the call and the last to hang-up, according to the preferred embodiment of the present invention.

Illustrated in FIG. 7A is a sequence diagram of the response of the SBP to an incoming call where the SBP handset is the first to answer the call and the last to hang-up. As described above, the SBP 310 receives the incoming call in the form of a SIP: INVITE message 502, responds by ringing, and transmits an analog ring signal 504 to each of the one or more analog phones 120. In the present example, the SBP handset 132 initially answers the incoming call and an analog phone enters the conversation at a later point in time.

When the SBP handset goes off-hook, the SBP 310 receives an off-hook signal 702 and automatically transmits a session acceptance message, preferably a SIP:OK message 704, back to the URL address in the session request. The SBP 310 also receives a SIP:ACK message 706 from the caller. The subsequent conversation exchanged between the remote caller and SBP handset 132 generally includes VoIP communications 708 between the SBP 310 and the caller or the SIP-PBX 410 as well as analog communications, i.e., handset voice signals 720, between the SBP 310 and handset 132.

When the analog phone 120 enters the call, an off-hook signal 712, 714 is transmitted to the phone 120 and forwarded to the SBP 310. Upon receipt, the conversation is directed to the analog phone handset 120 in the form of telephone voice signals 716 and handset voice signals 718. The voice signals 716 transmitted by the SBP 310 to the analog phone 120 are combined signals that include the voice signals from the remote caller and the SBP handset 132. The voice signals transmitted by the SBP 310 to the SBP handset 132 are a combination of the voice received from the one or more analog phones 120 and the remote caller. The combined voice signals transmitted to the remote caller are a combination of voice signals from the SBP handset 132 and the one or more analog phones 120. As one skilled in the art will appreciate, the SBP 310, therefore, operatively links the SPB handset 132 and analog phones 120 for parallel communication.

If the analog phone 120 subsequently goes on-hook prior to the SBP handset 132, the on-hook signal 620 is transmitted to the SBP 310 and the associated voice signals to the analog phone 120 discontinued. Note that even after the analog phone 120 goes on-hook, the SBP 310 remains in conversation with the caller, as illustrated by the SBP handset voice signal 724. When the SBP handset 132 later goes on-hook, the SBP 310 receives on-hook signal 726 and terminates the SIP session with SIP:BYE message 728 sent to the remote caller.

Figure 7B:
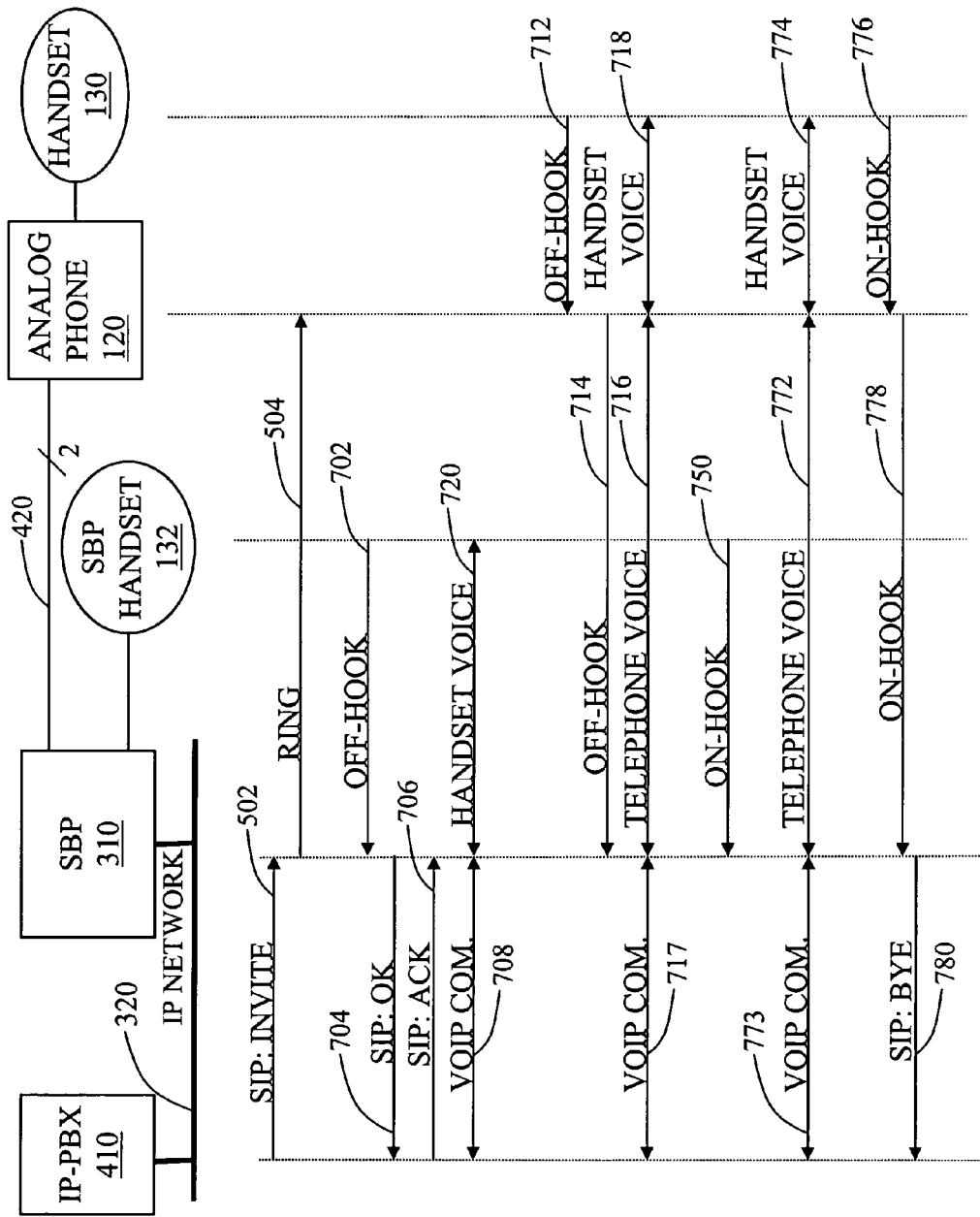
FIG. 7B is a sequence diagram of a SBP response to an incoming call in which the SBP handset is the first answer the call and an analog phone is the last to hang-up, according to the preferred embodiment of the present invention.

Illustrated in FIG. 7B is a sequence diagram of the response of the SBP to an incoming call in which the SBP handset is the first to answer the call and an analog phone is the last to hang-up. The initial call setup from the SIP:INVITE 502 to the voice communications 716, 718 is consistent with the previous example in FIG. 7A. In this scenario, however, the SBP handset 132, which is the first to answer the call, goes on-hook before the analog phone handset 130 goes on-hook.

Assuming that the SBP handset 132 and analog phone handset 130 are currently engaged in a parallel communications 716-718 with the remote caller, the user at the SBP handset 132 may subsequently exit the conversation by going on-hook. The on-hook signal 750 is issued to the SBP 310 and the associated handset voice 720 discontinued. The voice communication signals 772-774 exchanged between the analog phone set 120 and the SBP 310, however, persist after the SBP handset 132 hangs up. The VoIP session 773 between the SBP 310 and remote caller is terminated only after the analog phone set 120 goes on-hook 776, 778 and a session termination message, i.e., SIP:BYE message 780, is transmitted by the SBP 310 to the caller.

Figure 8A:
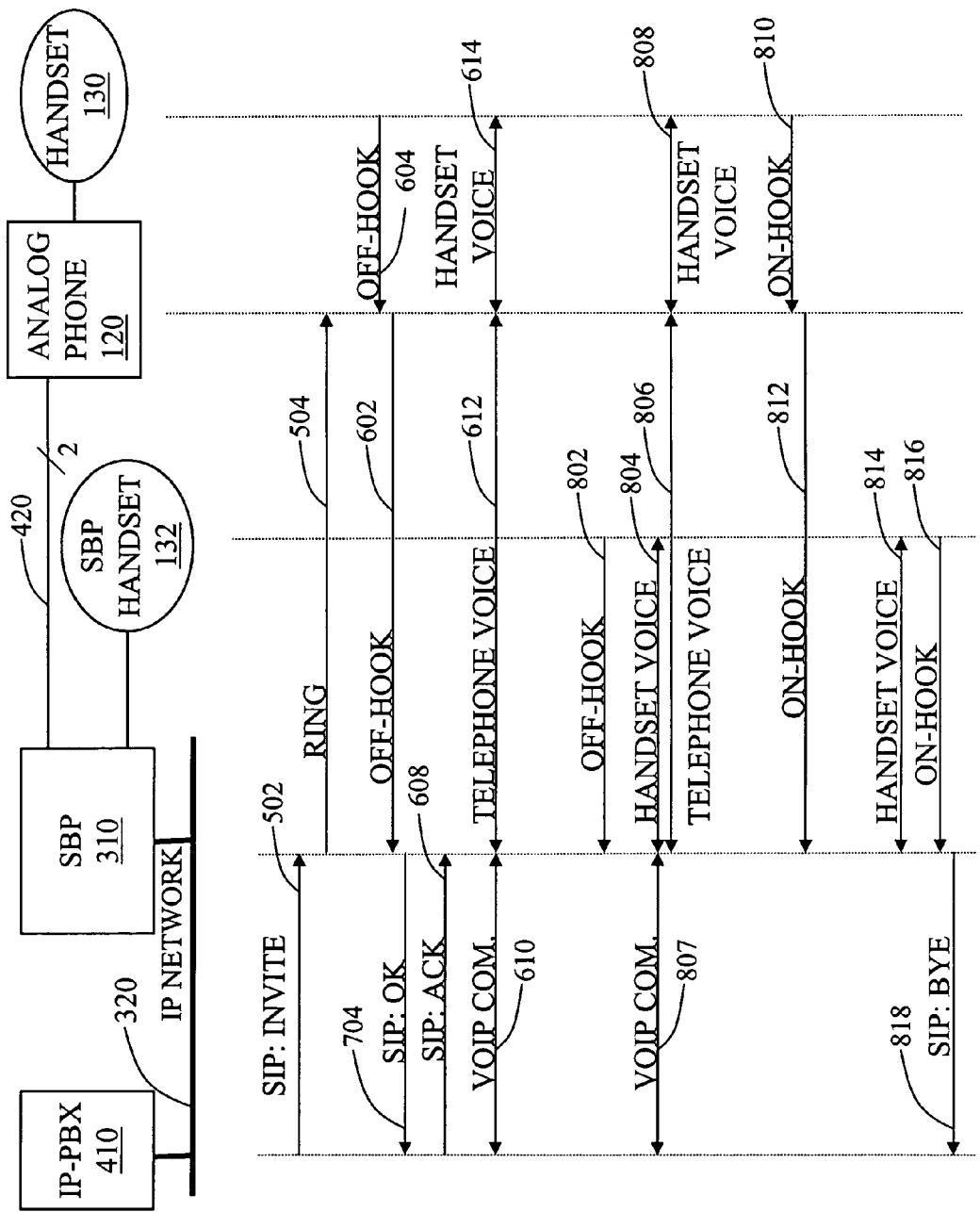
FIG. 8A is a sequence diagram of a SBP response to an incoming call in which an analog phone is the first answer the call and the SBP handset is the last to hang-up, according to the preferred embodiment of the present invention.

Illustrated in FIG. 8A is a sequence diagram of the response of an SBP to an incoming call in which an analog phone is the first to answer the call and the SBP handset is the last to hang-up. The initial call setup from the SIP:INVITE 502 to the voice communications 610, 612, 614 is consistent with the example in FIG. 6. In this scenario, however, the analog handset 130 goes on-hook before the SBP handset 132 goes on-hook.

Assuming the remote caller and analog phone 120 are in voice communication 610, 612, 614, the SBP handset 132 subsequently may join the conversation by going off-hook 802, which brings the handset 132 into the existing voice communication 806, 808 via voice communication signal 804. As described above, the voice communications 804, 806, 807, 808 are combined signals incorporating the voices of other parties so that each party may hear the other speak.

When the analog phone handset 130 later goes on-hook and the on-hook signal 810, 812 transmitted to the SBP 310, the SBP discontinues the voice communication to the phone handset 130 but maintains the SBP handset voice signals 814. Only after the SBP handset 132 goes on-hook 816 does the SBP 310 terminate the VoIP session 610 supporting the call with a SIP:BYE message 818.

Figure 8B:
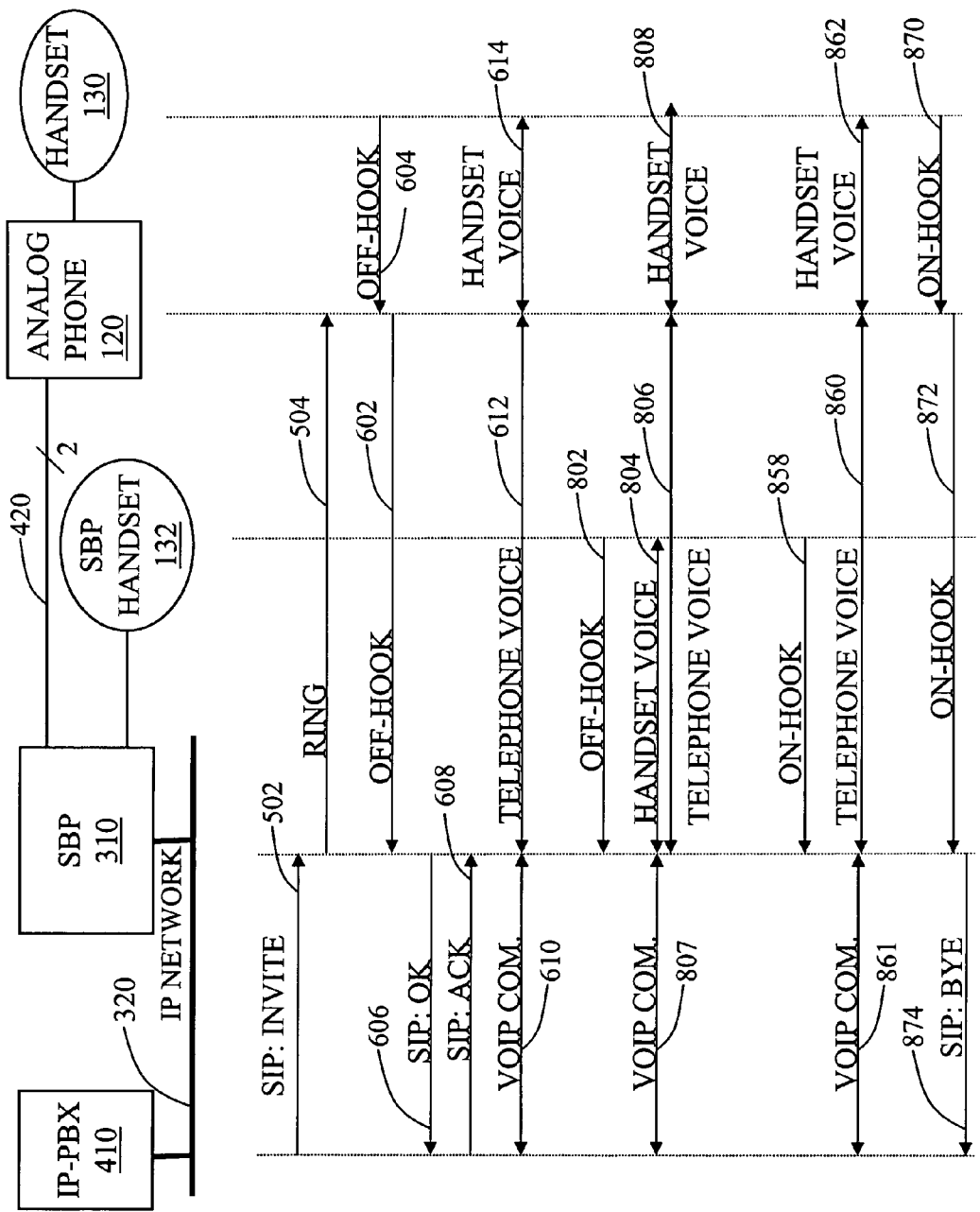
FIG. 8B is a sequence diagram of a response by the SBP to an incoming call in which an analog phone 120 is the first to answer and the last to hang-up, according to the preferred embodiment of the present invention.

Illustrated in FIG. 8B is a sequence diagram of a response by the SBP to an incoming call in which an analog phone 120 is the first to answer and the last to hang-up. The initial call setup from the SIP:INVITE 502 to the analog voice communications 806, 808 is consistent with the example in FIG. 8a. In this scenario, however, the analog handset 130, which was the first to answer the call, goes on-hook after the SBP handset 132 goes on-hook.

Here, the caller, the SBP handset 132, and analog phone are in voice communication 804, 806, 807, 808. The SBP handset 132 may subsequently exit the conversation in progress by going on-hook 858, which causes the SBP 310 to discontinue the handset voice signal 804 while still maintaining the telephonic voice communication signal 860 exchanged between the SBP 310 and the analog phone 120. When the analog phone handset 130 later goes on-hook and the on-hook signal 870, 872 transmitted to the SBP 310, the SBP discontinues the voice communication 860, 862 with the phone handset 130. Now that both the SBP phone 310 and analog phone 120 are on-hook, the SBP 310 may terminate the VoIP session with a SIP:BYE message 874 if the remote caller has not already done so.

Figure 9A:
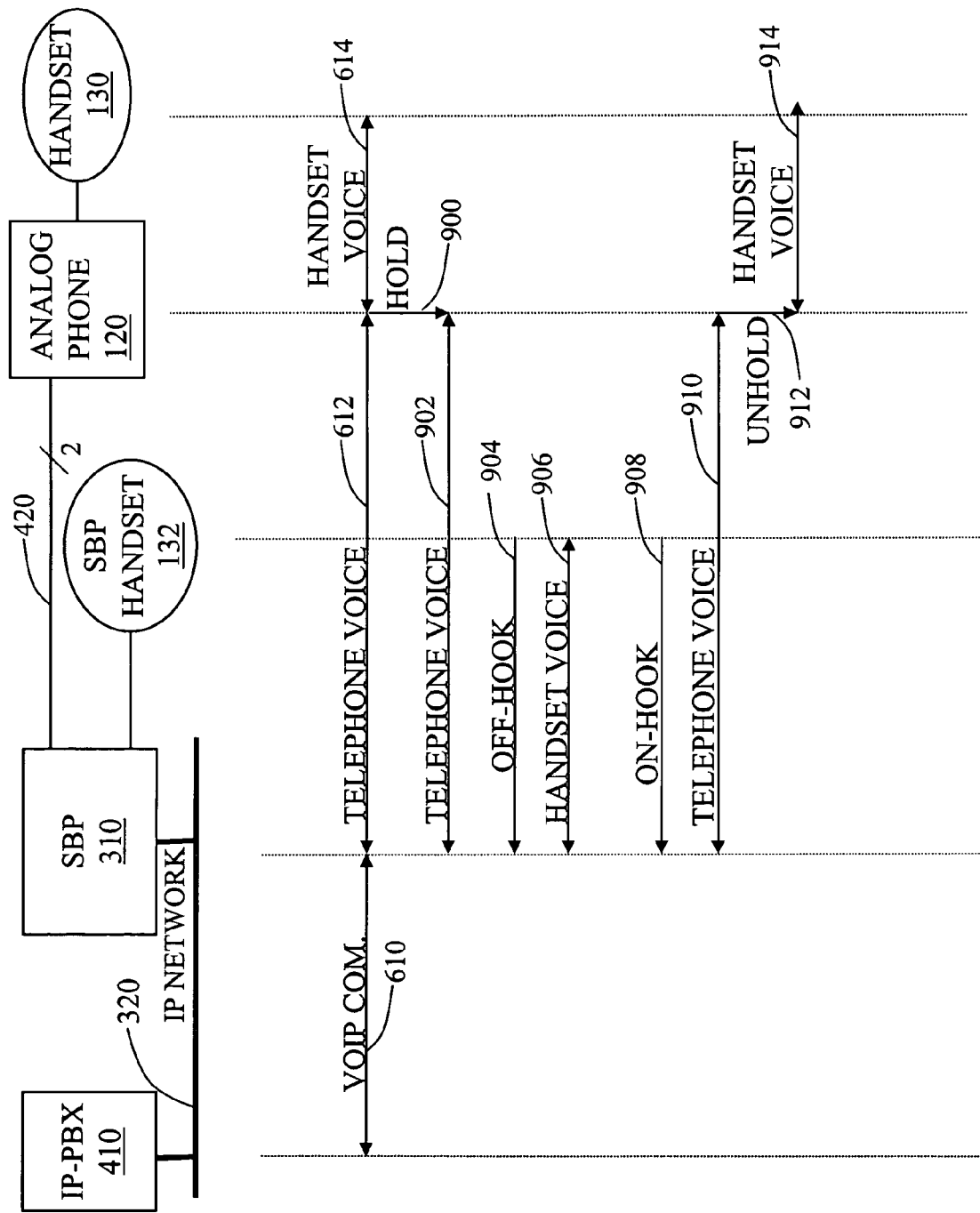
FIG. 9A is a sequence diagram of an SBP response to a call hold-on command and hold-off command executed at the analog phone, according to the preferred embodiment of the present invention.

Illustrated in FIG. 9A is a sequence diagram of a SBP response to a call hold command and unhold command received from an analog phone. In this example, there is an ongoing conversation between a remote caller and a user at the analog phone 120, the conversation being represented by the VoIP voice signals 610 and the analog voice signals 612, 614. At any point during the conversation, the user with a suitable analog phone 120 may place the call on hold by depressing a call hold button located on the analog phone. Activation of the hold input 900 at the analog phone causes the analog phone of the preferred embodiment to discontinue the handset voice signal 614 to the handset 130. Since the hold operation occurs completely within the analog phone 120 itself, the SBP 310 is unaware of the hold condition and continues to transmit the telephonic voice signal 902 to the analog phone 120.

If a user later resumes the conversation from the SBP 310, the SBP handset 132 goes off-hook and the SBP 310 transmits the voice signal 906 to the SBP handset, thereby bringing the user at the SBP 310 in voice communication with the remote caller. If the user places the SBP handset 132 on-hook, the SBP 310 terminates the handset voice signal 906 without affecting the on-going telephonic voice signal 910 transmitted to the analog phone 120. Moreover, the user may resume the conversation 914 from the analog phone handset 130 by removing the hold condition 912.

Figure 9B:
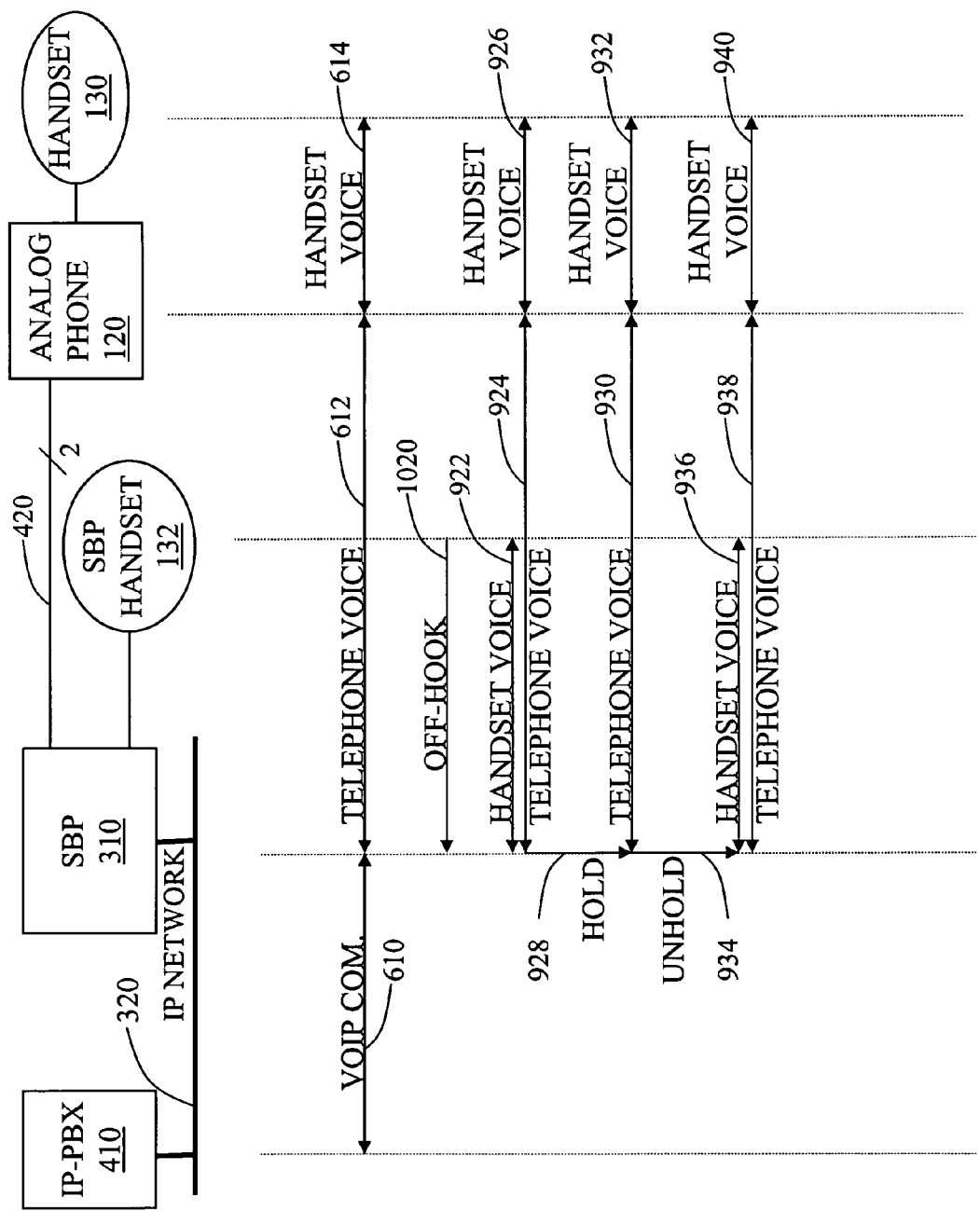
FIG. 9B is a sequence diagram of an SBP response to a call on-hold command and off-hold command received from an SBP phone, according to the preferred embodiment of the present invention.

Illustrated in FIG. 9B is a sequence diagram of the response of an SBP to a call hold command and unhold command received from an SBP phone. In this example, there is an ongoing conversation with a user at the analog phone 120, as is represented by the VoIP voice signals 610 and the analog voice signals 612, 614. At any point during the conversation, a user at the SBP 310 may pick up the SBP handset 132 and participate in the on-going conversation, as illustrated by handset voice signals 922. If the user at the SBP 310 activates 928 a call-hold button located on the tactile input of the SBP 310, the SBP 310 of the preferred embodiment discontinues the handset voice exchange 922. The scope of the hold operation is, however, confined to the SBP handset 312. As such, the SBP 310 continues to transmit the analog voice signals including telephonic voice signal 930, 932 to the analog phone 120.

To re-establish the voice communication to the SBP handset 132, the user need only de-activate 934 the call-hold, after which the SBP 130 resumes the SBP handset voice exchange 936 to the ongoing analog voice communications 938, 940. As described above, the SBP handset voice signals 936 and the analog phone handset voice signals 940 are combination signals including the audio received from the other parties to the conversation such that each party can hear every other party.

Figure 10A:
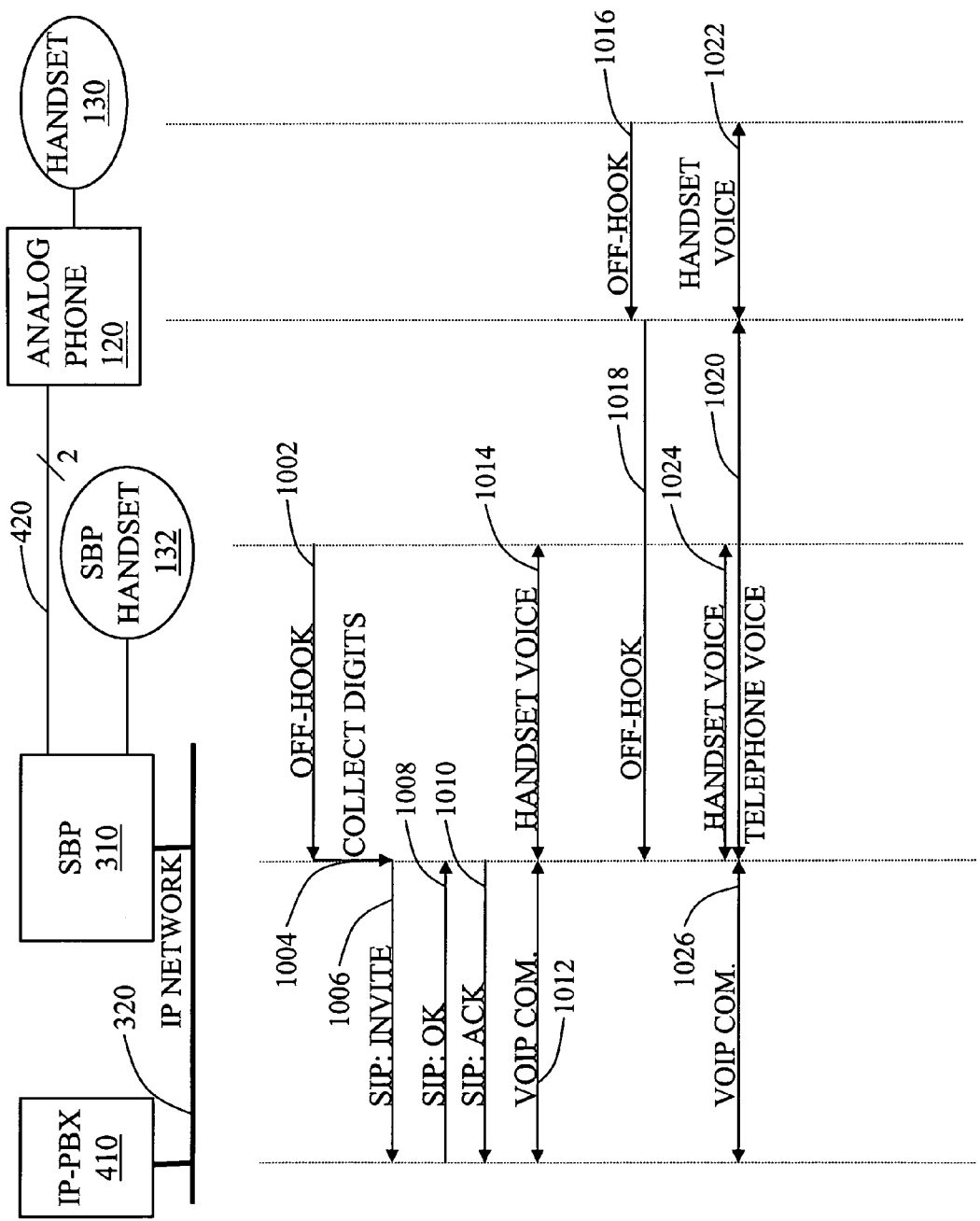
FIG. 10A is a sequence diagram of an SBP response to a call initiated by the user at the SBP handset, according to the preferred embodiment of the present invention.

Illustrated in FIG. 10A is a sequence diagram of the SBP responding to an incoming call initiated by the user at the SBP handset 132. After picking up the SBP handset 132, the user dials the phone number of the called party or otherwise enter a URL at the SBP 310. Upon receipt of the off-hook signal 1002 and collection of the dialed digits 1004, the SBP 310 generates a session request message, preferably SIP:INVITE message 1006, that is transmitted to the IP-PBX 410. The IP-PBX 410 responds with a session acceptance message, preferably SIP:OK message 1008 to establish the session. The subsequent voice communications 1012 are automatically transmitted to the SBP handset 132 via the handset voice 1014.

If and when the analog handset 120 goes off-hook 1016, 1018, the SBP 310 extends the voice communications 1012 to include the analog phone 120 in parallel with the SBP handset 132, as illustrated by the combined signals represented by the handset voice 1024, the telephone voice 1020 transmitted to the analog handset via handset voice 1022, and the VoIP communications transmitted to the IP-PBX 410.

Figure 10B:
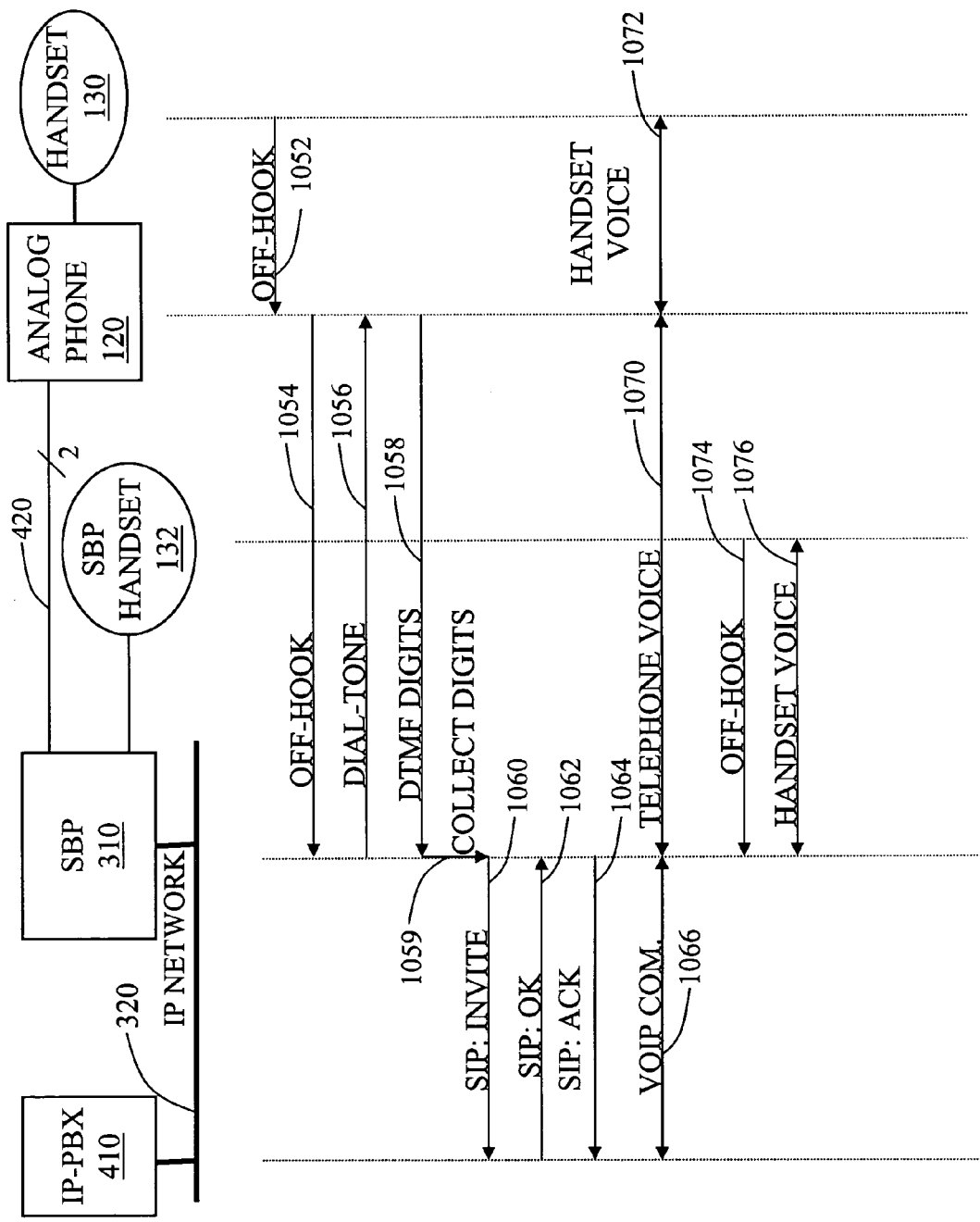
FIG. 10B is a sequence diagram of an SBP response to a call initiated by the user at an analog phone, according to the preferred embodiment of the present invention.

Similar to the outgoing call initiated by the SBP handset 132, FIG. 10B illustrates a sequence diagram of the response of an SBP to a call initiated by the user at the analog phone 130. When the user lifts the analog handset 130 to make a call, an off-hook signal 1052, 1054 is transmitted from the handset 130 to the analog phone 120 and then to the SBP 310. The SBP 310 responds with a dial-tone 1056, which effectively emulates the experience created by a true analog phone system. When the called-party phone number is entered by the user, it is transmitted to the SBP 310 in the form of DTMF digit signals 1058. In response, the SBP 310 collects 1059 the digits of the outgoing phone number dialed by the user, generates a session request message, preferably SIP:INVITE message 1060 having a URL derived from the DTMF digits, and transmits the session request message to the call recipient via the IP-PBX 410. If answered, the IP-PBX 410 transmits a session acceptance message message, preferably SIP:OK message 1062 to establish the session and communicate the call. The subsequent voice communications 1066 are automatically exchanged between the IP-PBX 410 and call recipient and the analog voice signal 1070, 1072 exchanged between the IP-PBX 410 and the one or more analog phones 120.

After the outgoing call is initiated by the analog phone user, the user may go on-hook or another user at the SBP handset 132 may go off-hook in the manner illustrated above. If, for example, the SBP handset 132 later goes off-hook 1074, the SBP 310 transmits the combined voice signals 1076 including the voice of the analog phone handset 130 and the remote party engaged in the call, i.e., the callee. The analog phone 120 also receives a combined signal placing that phone in parallel communication with the SBP handset 132.

Figure 11:
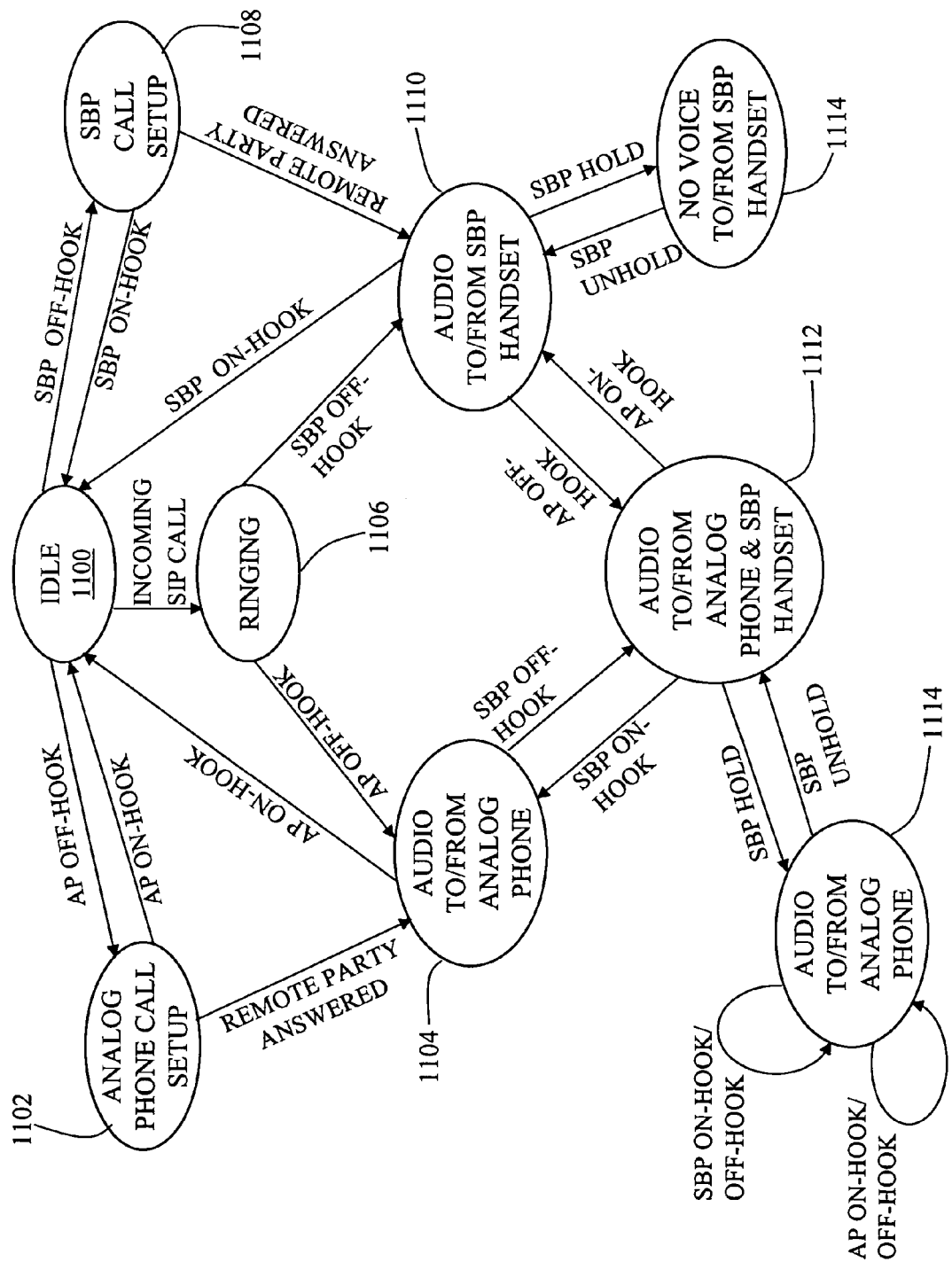
FIG. 11 is the state transition diagram for the SBP, which indicates the various states the SBP may occupy as the SBP handset and one or more analog devices participate in voice communications, according to the preferred embodiment of the present invention.

Illustrated in FIG. 11 is the state transition diagram for the SBP 310 that indicates the various states the SBP 310 may occupy as the SBP handset and one or more analog devices participate in voice communications. In the preferred embodiment, the SPB 310 persists in the idle state 1100 until an incoming call is received or an outgoing call is initiated. An incoming call generally takes the form of a connection request message, e.g., a SIP: INVITE, that causes the SBP 310 to ring, as indicated by ring state 1106. The incoming call may be answered at the analog handset 130 or at the SBP handset 132 unless the SBP 310 is configured to withhold the ring/ring signal from one or more ports. An off-hook signal from the analog phone causes the SBP 310 to enter an analog voice communications state 1104 in which the SBP 310 converts audio signals between the packet switched domain and the analog domain. An off-hook signal from the SBP handset 132 causes the SBP 310 to transition to an SBP voice communication state 1110 in which the SBP 310 translates data between the packet switched domain and the analog handset voice to/from the SBP handset 132.

An outgoing call may be initiated by taking the SBP handset 132 off-hook, which causes the SBP 310 to transition from the idle state 1100 to the SBP call setup state 1108 in which an SBP off-hook signal together with dialed digits cause the SBP 310 to attempt to establish a VoIP session for the outgoing call over the IP network 320. If the call is answered by the recipient, the SBP transitions to a voice communication state 1110 in which audio signals from the SBP handset 132 and call recipient are transmitted to the SBP 310 and SBP handset 132, respectively. Similarly, an outgoing call may be initiated by taking the AP handset 132 off-hook, which causes the SBP 310 to transition to the AP call setup state 1102 in which an off-hook signal together with dialed digits causes the SBP 310 to attempt to establish a VoIP session to support the outgoing call over the IP network 320. If the call is answered by the recipient, the SBP transitions to a AP voice communication state 1104 in which analog audio signals from the AP handset 130 and call recipient are transmitted to the SBP 310 and converted to a format suitable for the respective domain. The voice communication states 1104, 1110 may be subsequently terminated by either placing the applicable handset 103, 132 on-hook, thereby transitioning back to the idle state 1100 again.

The analog voice communication state 1104 and SBP voice communication state 1110 described above are mutually exclusive, meaning only the AP handset 132 is in conversation with the remote caller in state 1104 while only the SBP handset 130 is in conversation with the remote caller in state 1110. If, however, a second handset—other than a second analog phone—is used to participate in an on-going conversation, the SBP 130 generally transitions to the parallel communication state 1112 in which the SBP handset 132 and one or more AP handsets 130 both participate in the conversation with the outside party and with each other in a parallel manner. If, for example, the AP handset 132 is picked up during an on-going call involving the SBP handset 132, the SBP 310 transitions from the SBP voice communication state 1110 to the parallel communication state 1112. Similarly, the SBP 310 transitions from the AP voice communication state 1104 to the parallel communication state 1112 when the AP handset is picked up during an ongoing SBP voice communication session.

Once in the parallel voice communication state 1112, the SBP 310 may return to the AP voice communication state 1104 if the SBP handset 132 goes on-hook, or return to the SBP voice communication state 1110 if the AP handset 132 goes on-hook. If, however, the SBP 310 goes on hold while in the parallel voice communication state 1112, the SBP generally transitions to a first SBP hold state 1114 in which the SBP 310 continues to send analog voice signals to the analog phone 120 while temporarily withholding combined voice signals that might otherwise be transmitted to the SBP handset 132. While in the first SBP hold state 1114, the SPB handset 132 and AP handset 130 may go on-hook or off-hook without affecting the on-going transmission of voice signals to the analog phones 120. The SBP 310 of the preferred embodiment only transitions out of the first SBP hold state 1114 after the user depresses or otherwise deactivates an SBP un-hold input that causes the SBP 310 to return to the parallel communication state 1112.

The user may also place a call on hold while the SBP 310 is in the SBP voice communications state 1110. Activation of an SBP hold induces a transition to a second SBP hold state 1114 in which non-voice signals, including silence or background music for example, are transmitted to the SBP handset 132. The user may however, return to the call by activating an SBP un-hold and returning to the SBP voice communications state 1110.

Figure 12:
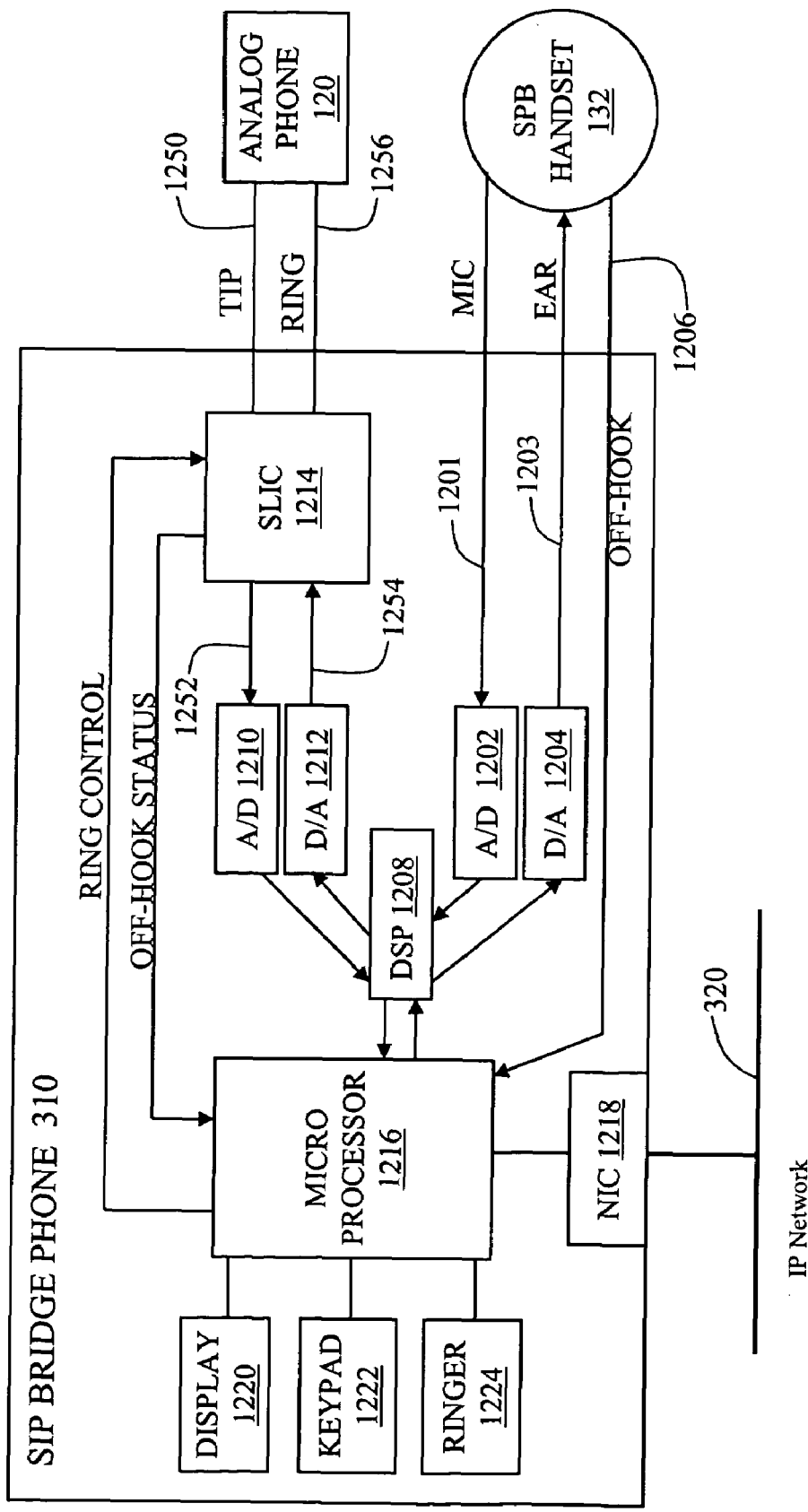
FIG. 12 is a functional block diagram of an SBP, according to the preferred embodiment of the present invention.

Illustrated in FIG. 12 is a functional block diagram of an SBP. In the preferred embodiment, the SBP 310 includes at least three interfaces including a first interface to an SBP handset, a second interface to an analog phone system, and a third interface to a network interface. One skilled in the art will appreciate that the SBP 310 may be adapted to interoperate with additional handsets, analog phones, and packet-switched networks.

The SBP handset interface preferably includes an analog-to-digital (A/D) converter 1202 for converting the analog voice signal (MIC) 1201 from the microphone (not shown) of the SBP handset to a digital signal transmitted to the digital signal processor (DSP) 1208. The SBP handset interface further includes a digital-to-analog (D/A) converter 1204 to convert the digital signal from the DSP 1208 to analog voice (EAR) 1203 transmitted to the ear piece of the SBP handset. A third line, control line 1206, may be used to transmit an off-hook signal from the SBP handset 132.

The SBP 310 preferably further includes an analog phone interface including an A/D converter 1210 for converting the analog voice signals received directly or indirectly from one or more analog phones 1252 into signals transmitted to the DSP 1208. The AP interface preferably includes a D/A converter 1212 that converts the digital voice signals mixed or otherwise combined by the DSP 1208 to analog signals transmitted to the Subscriber Line Interface Circuit (SLIC) 1214 operably connected to the AP handset. The SLIC 1214, which is well know to those skilled in the art, is adapted to execute ring generation, perform off-hook/on-hook detection, convert the tip signal 1250 to the A/D input signal 1252, convert from the D/A output signal 1254 to the ring-line voice signal 1256, and monitor timing and signal amplitude levels needed to connect to a conventional analog phone. A SLIC suitable for one or more embodiments of the present invention is produced by Silver Telecom of Newport, United Kingdom.

The DSP 1208 of the preferred embodiment performs digital-domain based mixing of various received voice signals to generate combination signals that allow all parties to the conversation to hear one another. As discussed above, the received voice signals include the SBP handset voice signals, analog phone handset voice signals, and remote party voice signals received from the network 320 via a network interface. The network interface generally includes a network interface card (NIC) 1218 and a microprocessor 1216 adapted to extract voice data from VoIP packets received from the IP-PBX and to encapsulate voice data transmitted to the remote caller.

The SBP 310 may further include a ringer 1224 or speaker for alerting an incoming call, a keypad 1222 to dial phone numbers, and a display 1220 for display call information, including time and call duration information, for example.

Figure 13:
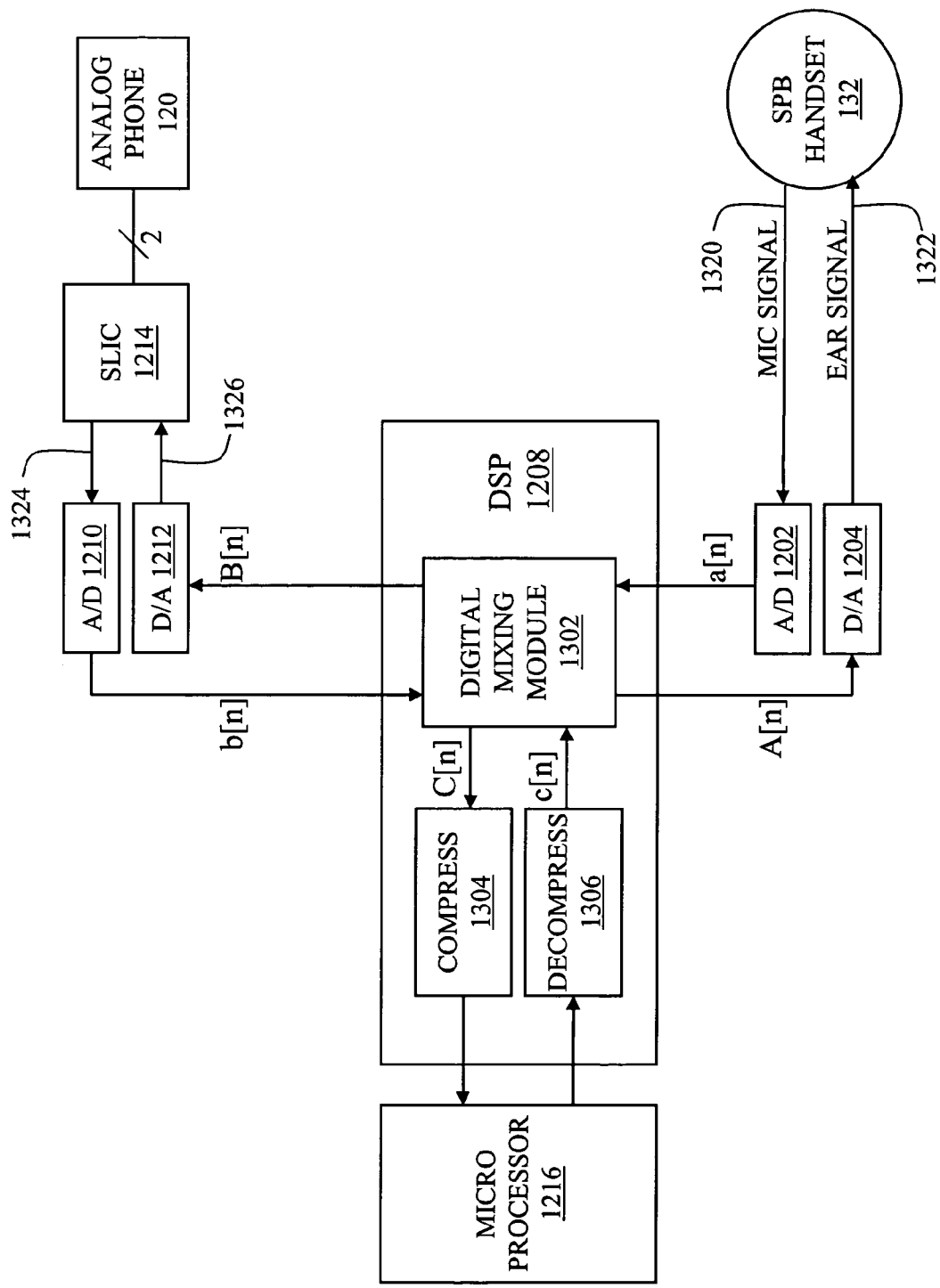
FIG. 13 is a functional block diagram of the SBP digital mixer, according to the preferred embodiment of the present invention.

Illustrated in FIG. 13 is a functional block diagram of the SBP digital mixer of the first preferred embodiment for combing signals between the SBP, the analog phone, and the remote party. As described above, the mixing of the digital signal from the remote user and SBP handset 132 with the analog voice signals from the one or more analog phones 120 permits every call participant to hear every other call participant. The digital signal processor (DSP) 1208 preferably comprises a digital mixing module (DMM) 1302 for mixing the appropriate signals from the various call participants, a speech compression module 1304 for performing digital audio compression of the outgoing combined signal transmitted to the remote caller using International Telecommunication Union Recommendations G.723 or G.729, for example, and a speech decompression module 1306 for decompressing the incoming compressed voice signal received from the remote caller.

In the preferred embodiment, the DMM 1208 receives the voice signals a[n] and b[n] from the A/Ds 1202, 1210 associated with the SBP handset 132 and the SLIC 1214, respectively, wherein n represents discrete unit of time. The DMM 1208 then combines signals a[n] and b[n] together with the uncompressed discrete-time speech signal c[n] from the remote party to produce combined signals A[n], B[n], and C[n]. In the preferred embodiment, the combined signals are given by the following 3×3 digital mixing matrix:

$$\begin{pmatrix} A[n] \\ B[n] \\ C[n] \end{pmatrix} = \begin{pmatrix} S_1 & C_{12} & 1 \\ C_{21} & S_2 & 1 \\ 1 & 1 & 0 \end{pmatrix} \begin{pmatrix} a[n] \\ b[n] \\ c[n] \end{pmatrix} \qquad [1]$$

where $S_1$ is a coefficient dictating the side-tone level from the SBP mic signal 1320 to the SBP earpiece signal 1322, $S_2$ is a coefficient dictating the side-tone level from the analog phone mic signal 1324 to the analog phone earpiece signal 1326, and $C_{12}$ and $C_{21}$ are cross-coupling coefficients dictating the degree to which the user at the SBP handset 132 and the user at the AP handset 130 hear each other. In practice, coefficient $S_2$ may be set to a value of zero since analog phones 120 typically already provide adequate side-tone level.

The first combined audio signal A[n] is transmitted to the D/A converter 1204 and then to the SBP handset earpiece, the second combined audio signal B[n] is transmitted to the D/A converter 1212 and then to the one or more analog phones via the SLIC 1214, and the third combined audio signal C[n] is transmitted to the compression module within the DSP so that it can be subsequently compressed and packetized within the VoIP RTP stream sent to the remote party.

As illustrated, the coefficients in the bottom row of the digital mixing matrix sum together signals a[n] and b[n], so that the remote party hears both the SBP user and the analog phone user. Similarly, the non-zero coefficients in the third column of the mixing matrix allow the incoming uncompressed speech from the remote party to be sent to both the SBP earpiece and the analog phone earpiece. Note that in the preferred embodiment, the digital mixing occurs using uncompressed voice signals since the DSP 1208 must perform decompression of the incoming RTP voice from the remote party, and must also perform compression for the outgoing RTP voice to the remote party. The DSP 1208 may also inject background comfort noise into signals A[n] and B[n] using techniques well-known to those skilled in the art. The background comfort noise may include a background hiss typical of analog phones to prevent occurrences of complete silence, which the user may interpret to mean the phone is broken or physically disconnected.

Figure 14:
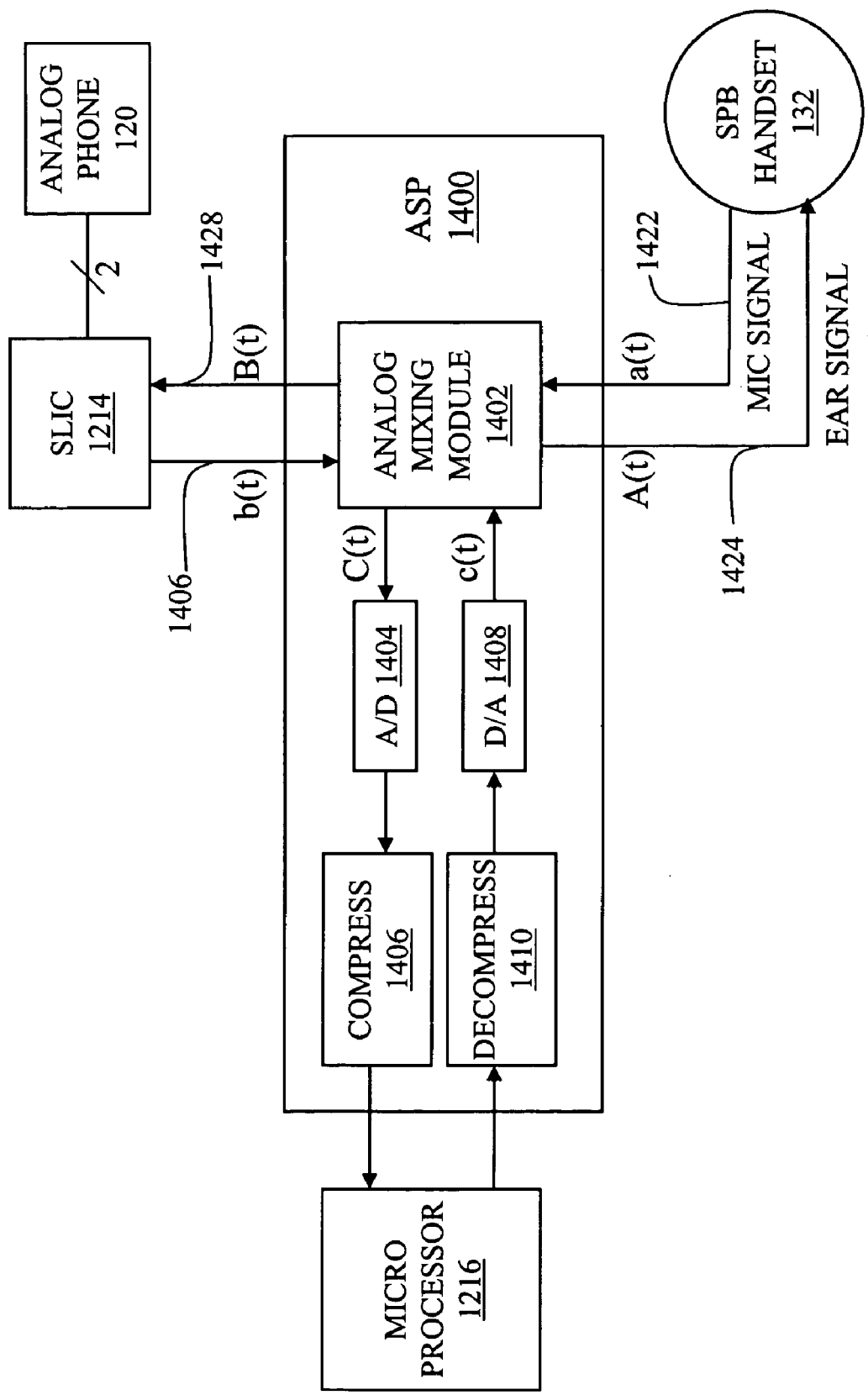
FIG. 14 is a functional block diagram of the SBP analog mixer, according to the second preferred embodiment.

Illustrated in FIG. 14 is a functional block diagram of the analog signal mixer of a second preferred embodiment, which may be used in the place of DSP 1208 to execute mixing of signals between the SBP, the analog phone and the remote party. The ASP 1400 generally comprises a analog mixing module (AMM) 1402 to appropriately mix the signals a(t), b(t), and c(t) from the various call participants, an A/D converter 1404 to digitize voice signals transmitted to the remote caller, a speech compression module 1406 for performing digital audio compression of the outgoing voice signal transmitted to the remote caller, a speech decompression module 1410 for decompressing the incoming voice data received from the remote caller, and a D/A converter 1408 for converting the incoming voice data to analog signals transmitted to the AMM 1402.

In this second preferred embodiment, the AMM 1402 receives the continuous-time signals a(t) and b(t) from the SBP handset 132 and the SLIC 1224, respectively. The AMM 1402 then combines signals a(t) and b(t) together with the uncompressed speech signal c(n) originating from the remote party to produce the combined signals A(t), B(t), and C(t). In the preferred embodiment, the combined signals are determined from the 3×3 digital mixing matrix:

$$\begin{pmatrix} A(t) \\ B(t) \\ C(t) \end{pmatrix} = \begin{pmatrix} S_1 & C_{12} & 1 \\ C_{21} & S_2 & 1 \\ 1 & 1 & 0 \end{pmatrix} \begin{pmatrix} a(t) \\ b(t) \\ c(t) \end{pmatrix} \qquad [2]$$

The combined audio signal A(t) is transmitted to directly to the SBP handset 132 earpiece, combined audio signal B(t) is transmitted to the one or more analog phones 120 via the SLIC 1224, and combined audio signal C(t) is transmitted to the A/D converter 1404 and then to the compression module 1406 where it is compressed before being transmitted as part of the VoIP RTP stream sent to the remote call participant.

Figure 15:
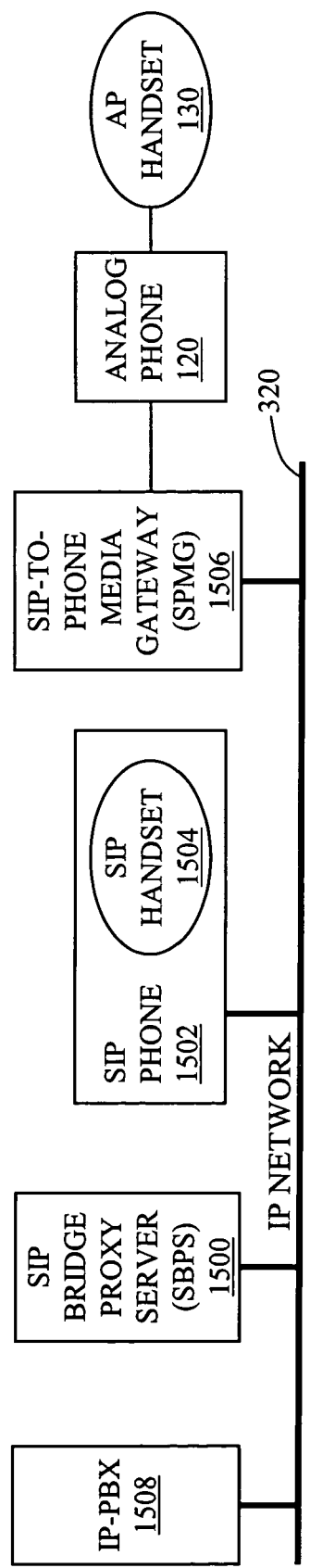
FIG. 15 is a network including proxy server adapted to achieve parallel telephonic communications between a conventional Session-Initiation Protocol phone and conventional SIP-to-Phone media gateway, according to the first preferred embodiment.

Illustrated in FIG. 15 is a representative network including a proxy server 1500 adapted to achieve parallel telephonic communications between a conventional Session-Initiation Protocol (SIP) phone 1502 and conventional SIP-to-Phone media gateway (SPMG) 1506. The proxy server, referred to herein as a SIP Bridge Proxy Server (SBPS) 1500, performs mixing operations of audio signal from the SIP phone 1502, the audio signal from the one or more analog phones 120 via a SPMG 1506, and the audio signal from a remote caller accessible through the IP-PBX 1508.

A SBPS 1506 may be employed in a hotel, for example, to combine the voice signals of a conventional SIP phone and the one or more analog phones of a hotel room. In this manner, the SIP phone 1502 and analog phones 120 enable parallel communications while exploiting the economy of scale offered by a single SBPS 1500. The functionality of the SBPS 1500 described below may be implemented as special-purpose software installed on a general purpose computer such as a standard personal computer (PC) or central processing unit (CPU).

If the SBPS 1500 is used to perform media processing and signaling for an entire hotel, for example, the SBPS is generally adapted to logically associate each of a plurality of SIP phones with one or more SPMGs. In this configuration, the SIP phone 1502 together with the associated SPMG appear as a single SIP user agent to a remote caller. The IP address for the SIP phone 1502 and the IP address for SPMG 1506 within the same room are logically linked and that association recorded in memory at the SBPS 1500.

Figure 16:
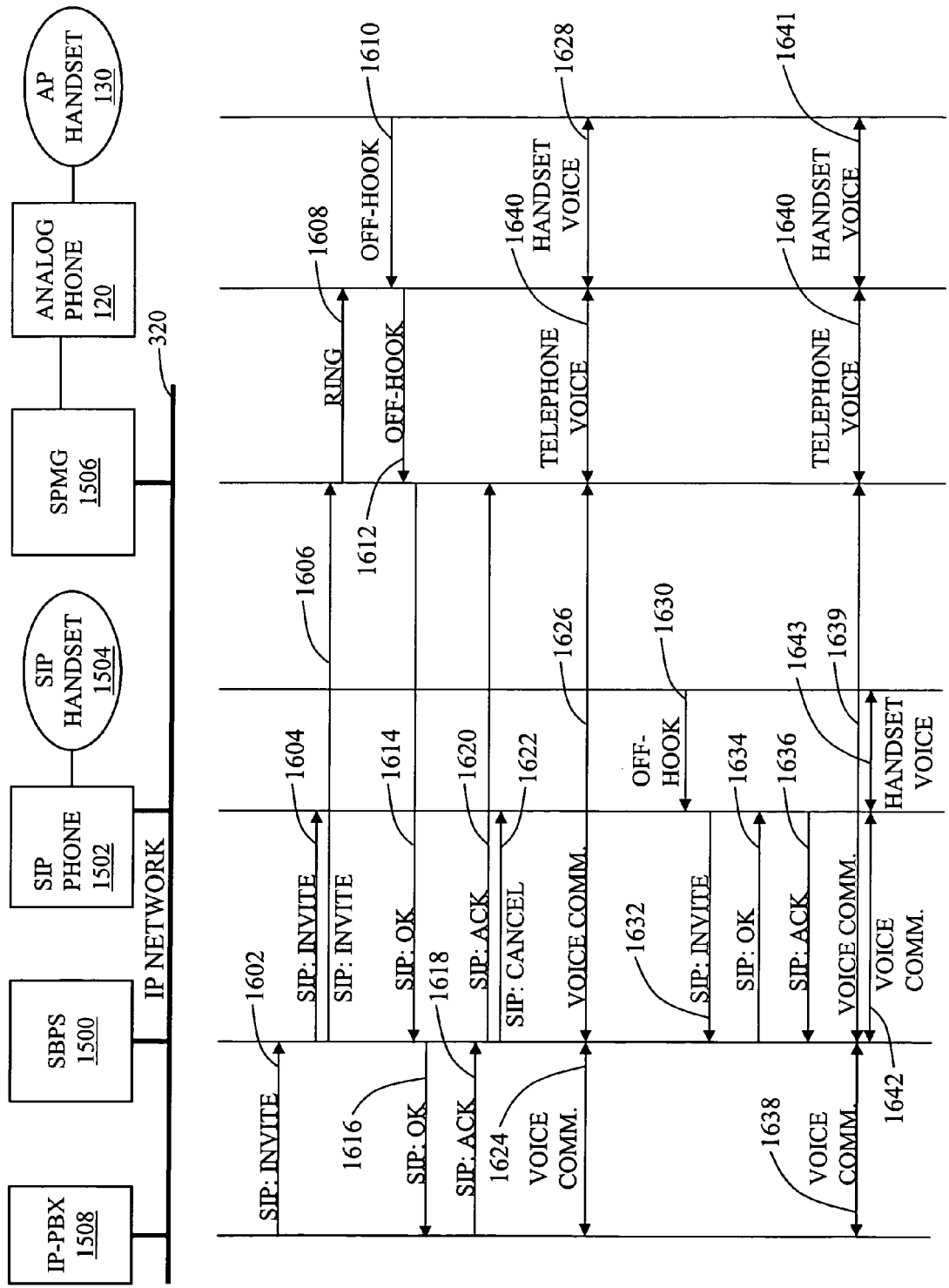
FIG. 16 is a sequence diagram of the SIP Bridge Proxy Server operation in response to an incoming call answered at an analog phone, according to the first preferred embodiment.

Illustrated in FIG. 16 is a sequence diagram of the response of an SBPS to an incoming call answered at an analog phone. The incoming is generally received in the form of a session request, e.g. a SIP: INVITE message 1602, from the IP-PBX 1508. Upon receipt, the SBPS 1500 forwards the session request to both the SIP phone 1502 and the SPMG 1506, as illustrated by SIP: INVITE messages 1604, 1606. The SPMG 1506, in turn, causes the analog phone 120 to ring 1608 concurrently with the SIP phone 1504. If the incoming call is answered at the analog phone 120, the off-hook signal 1610 from the AP handset 130 is transmitted to the SPMG 1506, which translates the signal to a session acceptance message, e.g. a SIP: OK message 1614, 1616 sent to the caller. When a session acknowledgment, e.g. SIP: ACK 1618 is received from the IP-PBX 1508, the SBPS 1500 forwards the SIP: ACK 1620 to the SPMG 1506 and transmits a session cancel message, e.g., SIP: CANCEL message 1622, to the SIP phone 1502. With the session initiated, RTP media flowing between the caller and call recipient puts them in conversation, as is indicated by voice communication signals 1624, telephonic voice signals 1626, and handset voice signals 1628.

If a user at the SIP phone 1502 later joins the ongoing conversation, an off-hook signal 1630 from the SIP handset 1504 is transmitted to the SBPS 1500, which then automatically generates a session request using the IP address of the SBPS previously programmed by the network administrator, for example. The session request, e.g., SIP: INVITE 1632, seeks to join the existing session with the associated AP handset 130. The SBPS 1500 answers the SIP: INVITE 1632 from SIP phone 1502 by issuing a session acceptance message, e.g. SIP: OK 1634. The SBPS 1500 then establishes parallel voice session involving the SIP phone 1502, AP handset 130, and remote caller, which is represented by voice communication signals 1638-1643. As described below, the SBPS 1500 also performs suitable digital mixing between these three RTP streams represented by these voice communication signals so that all three parties can hear each other.

Figure 17:
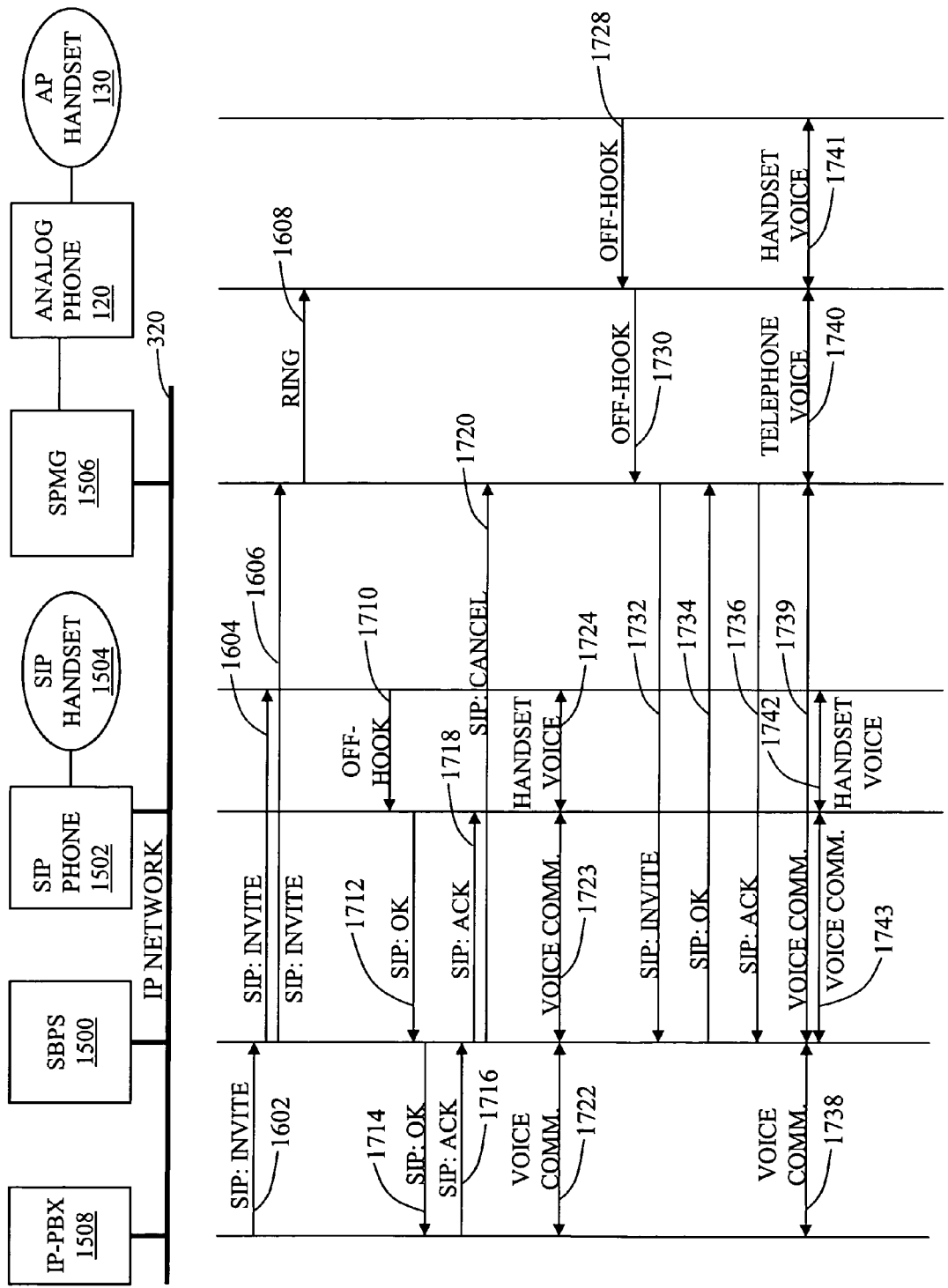
FIG. 17 is a sequence diagram of the SBPS operation in response to an incoming call answered at a SIP phone, according to the first preferred embodiment.

Illustrated in FIG. 17 is a sequence diagram of the response of the SBPS to an incoming call answered at a SIP phone. The incoming call is received in the form of a session request, e.g., a SIP: INVITE message 1602, from the IP-PBX 1508. The SBPS 1500 then forwards session requests, including first and second SIP: INVITE messages 1604, 1606, to the SIP phone 1502 and the SPMG 1506, respectively. The SPMG 1506 causes the analog phone 120 to ring 1608 concurrently with the SIP phone 1504. If the incoming call is answered at SIP phone handset 1504, the off-hook signal from the phone is translated to a session acceptance message, e.g., SIP: OK 1712, 1714, sent to the caller. When a session acknowledgment, e.g. SIP: ACK 1716 is received from the IP-PBX 1508, the SBPS 1500 forwards the SIP: ACK 1718 to the SIP phone 1502 and transmits a session cancel message, e.g. SIP: CANCEL message 1720, to the SPMG 1506. With the session initiated, an RTP media transmitted between the caller and call recipient may be used to bring the parties in voice contact, as is signified by voice communication signals 1722-1724.

If a user at the AP phone 120 later joins the ongoing conversation, an off-hook signal 1728, 1730 from the AP handset 130 is transmitted to the SBPS 1500, which automatically generates a session request using the IP address of the SBPS previously programmed. The session request, e.g., SIP: INVITE 1732, seeks to join the existing session with the associated SIP handset 1504. The SBPS 1500 responds to the SIP: INVITE 1732 from AP phone 130 by issuing a session acceptance message, e.g., SIP: OK 1734. The SBPS 1500 then establishes a parallel voice session involving the SIP phone 1502, AP handset 130, and remote caller, which are represented by voice communication signals 1738-1739, 1743, SIP handset voice 1742, telephonic voice 1740, and analog handset voice 1741. As described below, the SBPS 1500 also performs suitable digital mixing between these three RTP streams represented by these voice communication signals so that all three parties can hear each other.

Figure 18:
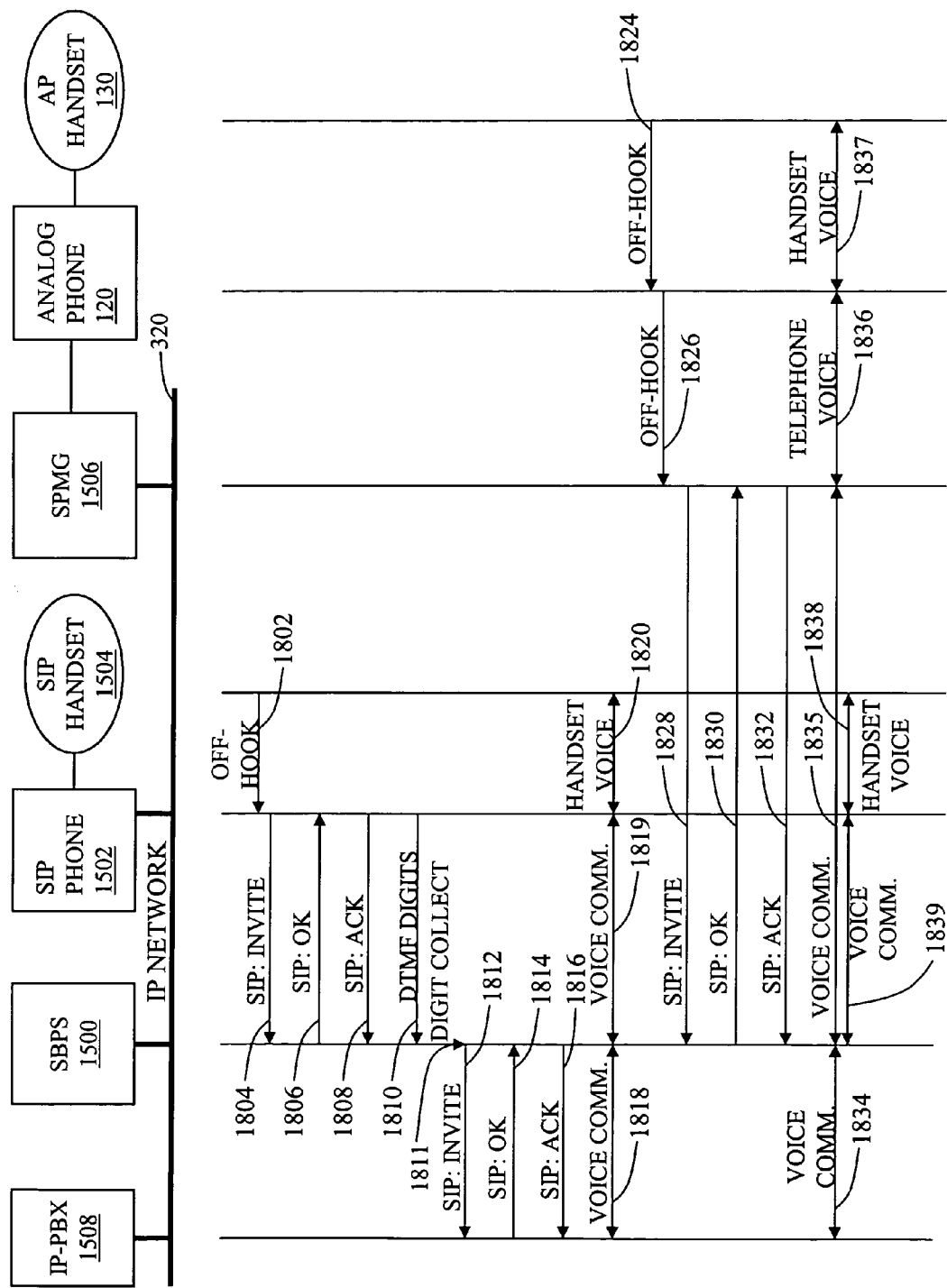
FIG. 18 is a sequence diagram of the SBPS operation in response to an outgoing call initiated from a SIP phone, according to the first preferred embodiment.

Illustrated in FIG. 18 is a sequence diagram of the response of an SBPS to an outgoing call initiated from a SIP phone. In the process of making an outgoing call, the user lifts the SIP handset 1504 and causes an off-hook signal 1802 to be sent to the SIP phone 1502. The SIP phone 1502 of the preferred embodiment is programmed to collect 1811 the digits of the outgoing call and generate a session request, e.g., SIP:INVITE 1804, sent to the SBPS 1500. The SBPS 1500, in turn, is adapted to automatically respond with a session acceptance message, e.g. SIP: OK message 1806, to complete the creation of the session. Assuming the session is established immediately upon receipt of the SIP:INVITE 1804, the SBPS 1500 further collects the digits representing the phone number of the dialed party, which is represented by DTMF digits signal 1810. The DTMF digits signal 1810 may be sent via in-band or out-of-band channels.

The SBPS 1500 also transmits a session request, e.g., SIP:INVITE message 1812, to the called party, which is remotely located in the data communications network 320 in this example. If the remote party accepts the call, a session acceptance message, preferably SIP:OK message 1814, establishes a session used to exchange voice data, as represented by the voice communication exchanges 1818-1820.

A user at the AP phone 120 may later join the ongoing conversation by merely picking up the AP handset 130. The off-hook signal 1824, 1826 from the AP handset 130 is automatically translated into a session request to seek participation in the ongoing conversation with the associated SIP phone 1502. The session request, e.g., SIP INVITE message 1828, triggers the construction of a session between the SBPS 1500 and the analog phone 120. In particular, receipt of the session acceptance message, preferably SIP: OK message 1830, establishes the session needed to provide parallel voice communication between the SIP phone 1502, the analog phone 120, and the remote call recipient. The parallel voice communication is represented by the voice communication signals 1834, 1835, 1839, SIP phone handset voice signals 1838, telephonic voice 1836, and analog handset voice 1837. As described in more detail below, the SBPS 1500 performs suitable digital mixing between the three RTP streams, so that the SIP phone 1502 and analog phone 120 are in parallel communication and so that three parties can hear each other.

Figure 19:
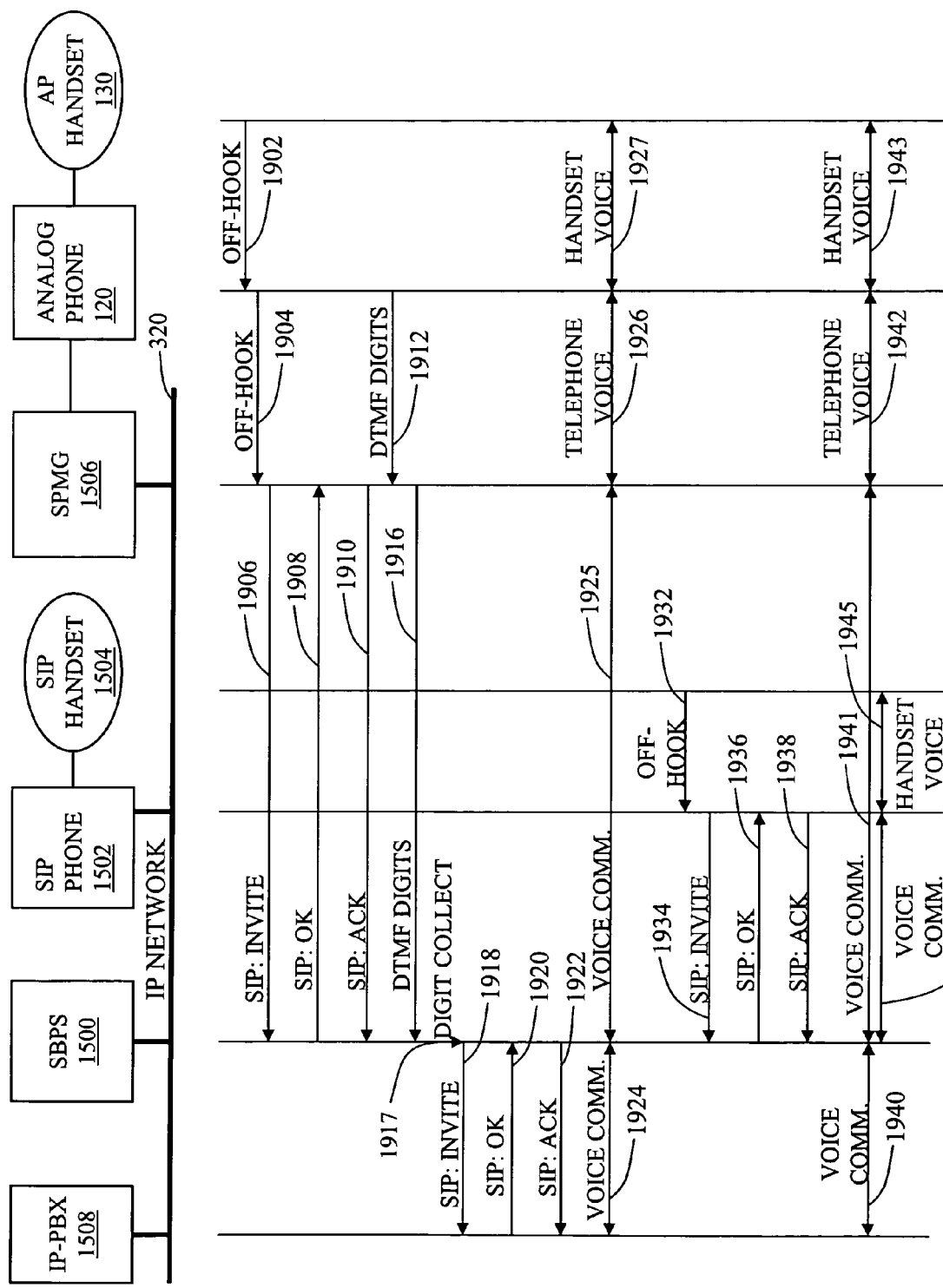
FIG. 19 is a sequence diagram of the SBPS operation in response to an outgoing call initiated from an analog phone, according to the first preferred embodiment.

Illustrated in FIG. 19 is a sequence diagram of the response of the SBPS to an outgoing call initiated from an analog phone. When the user lifts the AP handset 130 and dials the called party phone number, an off-hook signal 1902 is sent to the AP phone base 120 and then to the SPMG 1506. The SPMG 1506 of the preferred embodiment is programmed to collect 1917 the digits of the outgoing call and automatically generate a session request, e.g., SIP:INVITE message 1906, which is sent to the SBPS 1500. The SBPS 1500, in turn, is adapted to automatically respond with a session acceptance message, e.g. SIP: OK message 1908, to complete the session. Concurrent with the establishment of the session, the SBPS 1500 also collects the digits of the phone number inputted by the user, which is represented by DTMF digits signals 1912, 1916. Assuming the called party responds to the session request, preferably SIP:INVITE 1918, with a session acceptance, e.g. SIP:OK message 1920, the user at the analog phone 120 and call recipient will be placed in audio contact, as indicated by voice communication signals 1924-1927.

If a user at the SIP phone 1502 subsequently joins the ongoing conversation, the off-hook signal from the SIP handset 1504 stimulates the SIP phone 1502 to automatically transmit a request, e.g., SIP:INVITE message 1934, to join the existing session involving the associated AP phone 120. If and when the SBPS 1500 subsequently responds to the session request with the session acceptance, SIP: OK 1936, and the SIP phone 1502 responds with the SIP:ACK message 1938, the SIP handset 1504 is joined into the conversation such that the caller, call recipient, and party at the SIP handset 1504 can speak to and hear each other. The three-way conversation is illustrated by voice communication signals 1940-1945.

Figure 20:
FIG. 20 is a sequence diagram of the analog and digital signals that are received by and transmitted from the SBPS to support a parallel communication involving a SIP phone and analog phone, according to the first preferred embodiment.
Figure 20:
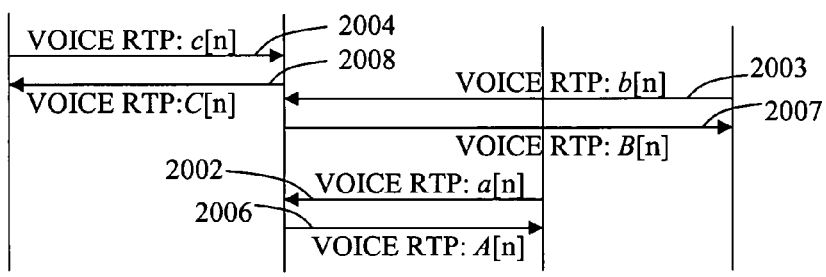
Figure 21:
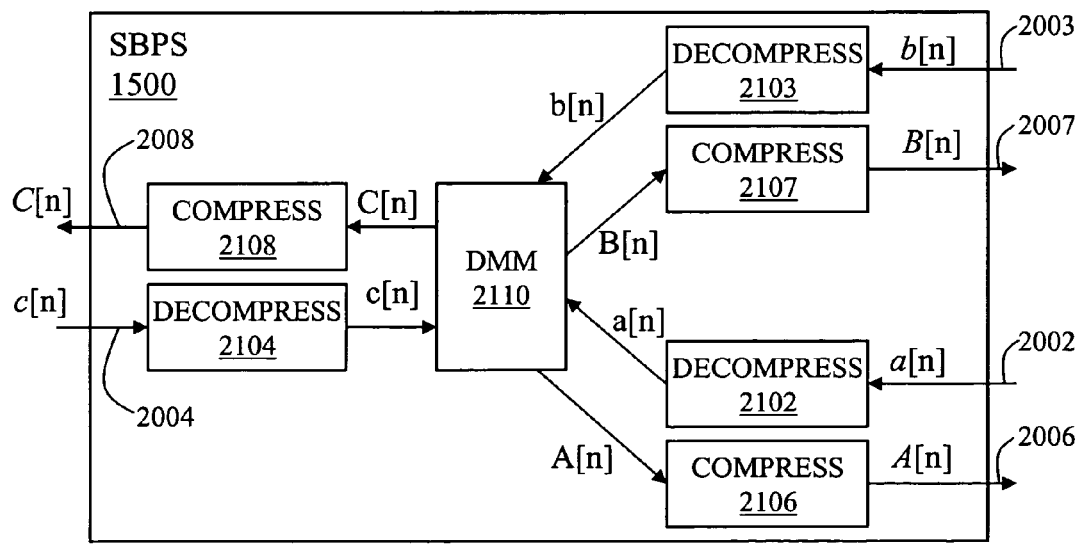
FIG. 21 is a function block diagram of a SBPS adapted to execute mixing of analog and digital voice signals in the digital domain, according to the first preferred embodiment.

Illustrated in FIG. 20 is a diagram of the analog and digital signals that are transmitted to and from the SBPS to support a parallel communication between a SIP phone and analog phone. Illustrated in FIG. 21 is a functional block diagram of an SBPS of the first preferred embodiment, which is adapted to execute mixing of analog and digital voice signals in the digital domain. As illustrated in FIGS. 20 and 21 together, the SBPS 1500 receives the multiple packetized voice data signals including the voice RTP signals 2002-2004 from the analog phone 120 via the SPMG 1506, the SIP phone 1502, and IP-PBX 1508, respectively. These voice signals a[n], b[n], and c[n] 2002-2004 are decompressed by decompression modules 2102-2104, respectively, and the associated uncompressed signals digitally mixed by the DMM 2110 in accordance with the following equation:

$$\begin{pmatrix} A[n] \\ B[n] \\ C[n] \end{pmatrix} = \begin{pmatrix} S_1 & C_{12} & 1 \\ C_{21} & S_2 & 1 \\ 1 & 1 & 0 \end{pmatrix} \begin{pmatrix} a[n] \\ b[n] \\ c[n] \end{pmatrix}, \quad [3]$$

where A[n], B[n], and C[n] are the mixed uncompressed input signals provided to the SBPS 1500 from the SIP phone 1502, the analog phone 120, and the remote caller, respectively, where a[n], b[n], and c[n] are the uncompressed combined signals provided as output from the SBPS 1500 to the SIP phone 1502, the analog phone 120, and the remote caller, respectively, coefficient $S_1$ defines the side-tone level from the SIP phone microphone signal 2002 to the SIP phone ear signal 2006, coefficient $S_2$ defines the side-tone level from the analog phone microphone signal 2003 to the analog phone earpiece signal 2007, and $C_{12}$ and $C_{21}$ are cross-coupling coefficients.

The combined signals A[n], B[n], and C[n] having a mixing of the input voice signals a[n], b[n], and c[n] are then subjected to data compression in the speech compression modules 2106-2108, respectively. The resulting compressed voice communications signals 2006-2008 are then transmitted to the appropriate party as VoIP packets. One skilled in the art will appreciate that there are many suitable mixing algorithms and technologies found in existing IP conferencing systems that would provide suitable alternatives to the preferred embodiment of the SBPS 1500.

Figure 22A:
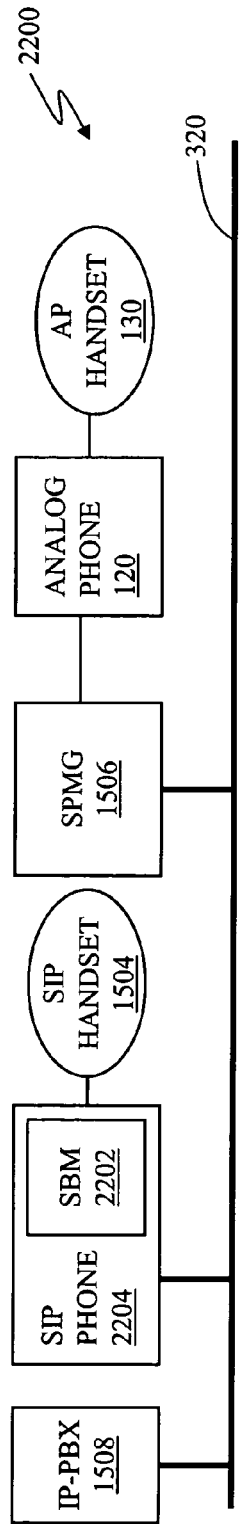
FIG. 22A is a network including a SIP phone adapted to implement parallel telephonic communications between the SIP phone and analog phone via a conventional SIP-to-Phone media gateway, according to the third preferred embodiment.

Illustrated in FIG. 22A is a network including a SIP phone adapted to implement parallel telephonic communications between the SIP phone and analog phone via a conventional SIP-to-Phone media gateway. In this alternative to the embodiment described in FIG. 15, the enhanced SIP phone 2204 integrally includes a first embodiment of a SIP bridge module (SBM) 2202 adapted to receive and combine packetized voice signals from the SIP handset 1504 and analog voice signals from the associated one or more analog phones 120 via a SPMG 1506. The SBM 2202 functions consistent with the SBPS 1500 described above, but may be implemented in the form of a software or firmware upgrade to a SIP phone, for example, without the need for a network device, such as a SPMG, that is dedicated to mixing the combined voice signals necessary for parallel communication. As described above, the SBM 2202 is adapted to perform mixing operations of audio signals from the SIP handset 1504, the audio signals from the one or more AP handsets 130 via a SIP-to-Phone Media Gateway (SPMG) 1506, and a remote caller accessible through the IP-PBX 1508 such that each call participant is able speak to and hear every other call participant.

Figure 22B:
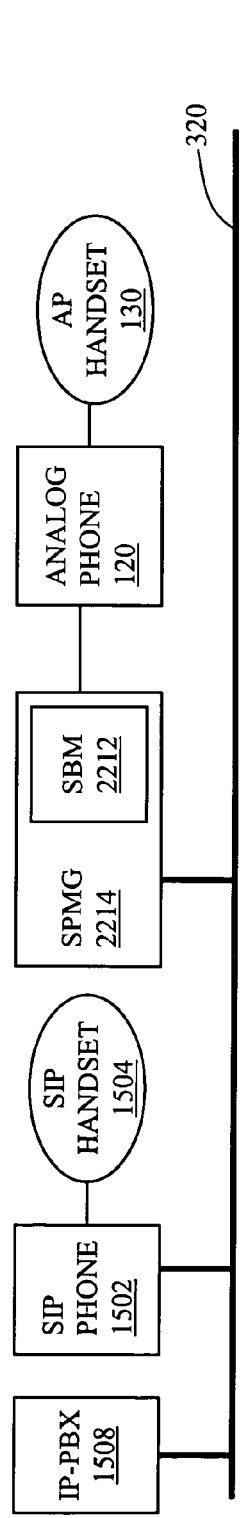
FIG. 22B is a network including an SPMG integrally incorporating a second embodiment of a SBM adapted to implement parallel telephonic communications between a conventional SIP phone and an analog phone, according to the fourth preferred embodiment.

Illustrated in FIG. 22B is a network including an SPMG adapted to implement parallel telephonic communications between a conventional SIP phone and an analog phone. In this alternative embodiment, the enhanced SPMG 2214 integrally includes a second embodiment of a SBM 2212 adapted to receive and combine voice signals from the SIP phone 1502 and remote caller via the network 2210 and analog voice signals directly from the one or more analog phones 120. The SBM 2212 the combined signals generated by the second SBM 2212 are preferably generated using the mixing matrix above to provide parallel communications between the SIP phone 1504 and the associated one or more analog phones 120. The function of the SBM 2212 of the second preferred embodiment is consistent with the SBPS 1500 described above, but may be implemented in the form of a software or firmware upgrade to the SPMG 1506 discussed above without the need for a dedicated network device.

Figure 22C:
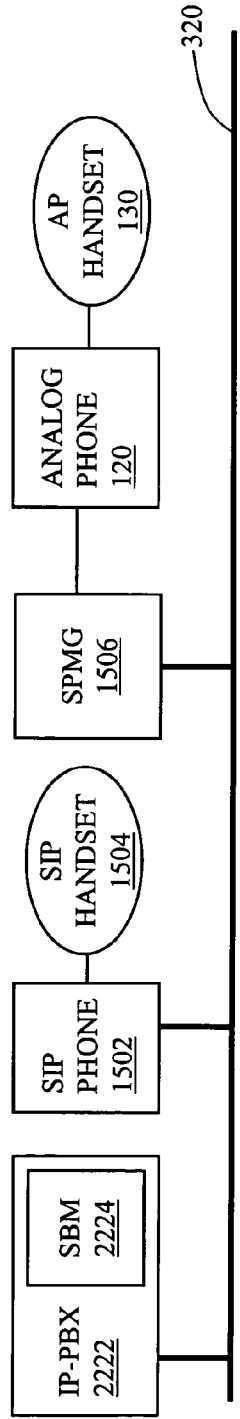
FIG. 22C is a network including a Private Branch Exchange (PBX) integrally incorporating a third embodiment of an SBM for implement parallel telephonic communications between a conventional SIP phone and a conventional analog phone, according to the fifth preferred embodiment.

Illustrated in FIG. 22C is a network including a Private Branch Exchange (PBX) adapted to provide parallel telephonic communications between a conventional SIP phone and a conventional analog phone. In this alternative embodiment, the network 2220 includes an enhanced SIP-PBX 2222 integrally incorporating a third embodiment of a SBM 2224 adapted to receive and combine packetized voice signals from the SIP phone 1504, the associated one or more analog phones 120, and the remote caller. The SIP phone 1502 and SPMG 1506 are conventional, prior art devices. The third SBM 2224 functions consistently with the SBPS 1500 described above, but may be integrated into the IP-PBX or SIP PSTN Gateway, for example, using a software or firmware upgrade.

While the one or more analog phones 120 are reachable through the SPMG 1506 in this embodiment, one skilled in the art will recognize that a SBM may be implemented in a standard PBX, i.e., a non-IP based PBX, in which one or more analog phones are directly coupled to the PBX. In this alternative embodiment, the third SBM bridges multiple analog phones. The logical association may be dynamically created and changed as needed, thus allowing a hotel, for example, to operate the phones of two rooms in parallel when the rooms are configured as a suite and operate the phones independently when the rooms are configured for separate guests.

Figure 23:
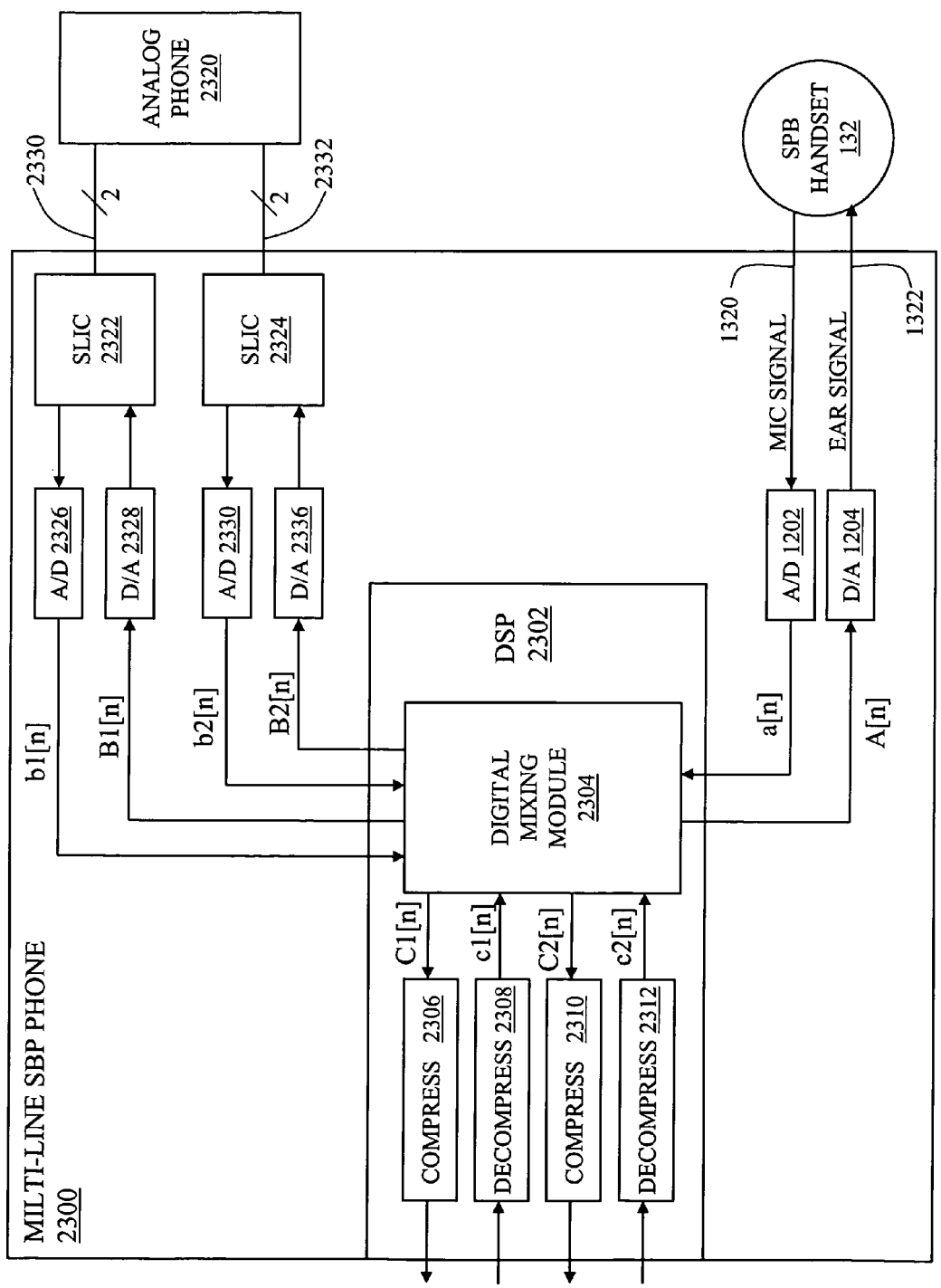
FIG. 23 is a multi-line SBP with a DSP for supporting parallel communications between two analog phone lines, according to the sixth preferred embodiment.

Illustrated in FIG. 23 is a multi-line SBP with a DSP for supporting parallel communications between two analog phone lines and the SBP handset. The multi-line SBP 2300 preferably includes an analog phone interface including RJ-11 telephone jacks for a first telephone line 2330 and a second telephone line 2332 operatively coupled to a first SLIC 2322 and a second SLIC 2324, respectively. The first SLIC 2322 and second SLIC 2324 are adapted to transmit analog voice signals to A/D converters 1226, 2330, respectively, which are then passed to the DMM 2304 of the DSP 2302 in the form of digital voice signals b1[n] and b2[n].

In addition to the plurality of signals from the analog sources, the multi-line SBP 2300 includes a network interface adapted to receive two or more digital voices signals, c1[n] and c2[n], from a plurality of SIP phones (not shown). If compressed, the digital voices signals c1[n] and c2[n] are passed through speech decompression units 2308, 2312, respectively before being sent to the DMM 2304.

The multi-line SBP 2300 of the preferred embodiment further includes an SBP handset interface adapted to receive an analog microphone signal 1320 from the SBP handset 132, which is converted to the digital voice signal a[n] by the A/D converter 1202. The DMM 2301 receives the voice signals and generates a plurality of digital voice signals, referred to herein as combined signals, including A[n] sent to the SPB handset 132 via the ear signal 1322 from the D/A converter 1204, B1[n] transmitted to the first line 2330 of the analog phone 2320 via the first analog phone line from the D/A converter 2328, B2[n] transmitted to the second line 2332 of the analog phone 2320 via the second analog phone line from the D/A converter 2336, C1[n] transmitted to the first of the plurality of SIP phones via the speech compression module 2306, and C2[n] transmitted to the second of the plurality of SIP phones via the speech compression module 2310. The combined signals are mixed in the preferred embodiment according to one of the following equations depending on which of the plurality of analog lines is active If only the first analog line 2330 is active:

$$\begin{pmatrix} A[n] \\ B_1[n] \\ B_2[n] \\ C_1[n] \\ C_2[n] \end{pmatrix} = \begin{pmatrix} S_1 & C_{12} & 0 & 1 & 0 \\ C_{21} & S_2 & 0 & 1 & 0 \\ 0 & 0 & S_2 & 0 & 1 \\ 1 & 1 & 0 & 0 & 0 \\ 0 & 0 & 1 & 0 & 0 \end{pmatrix} \begin{pmatrix} a[n] \\ b_1[n] \\ b_2[n] \\ c_1[n] \\ c_2[n] \end{pmatrix} \quad [4]$$

If only the second analog line 2332 is active:

$$\begin{pmatrix} A[n] \\ B_1[n] \\ B_2[n] \\ C_1[n] \\ C_2[n] \end{pmatrix} = \begin{pmatrix} S_1 & 0 & C_{12} & 0 & 1 \\ 0 & S_2 & 0 & 1 & 0 \\ 0 & 0 & S_2 & 0 & 1 \\ 0 & 1 & 0 & 0 & 0 \\ 1 & 0 & 1 & 0 & 0 \end{pmatrix} \begin{pmatrix} a[n] \\ b_1[n] \\ b_2[n] \\ c_1[n] \\ c_2[n] \end{pmatrix} \quad [5]$$

If both the first analog line 1330 and second analog line 2332 are active:

$$\begin{pmatrix} A[n] \\ B_1[n] \\ B_2[n] \\ C_1[n] \\ C_2[n] \end{pmatrix} = \begin{pmatrix} S_1 & C_{12} & C_{12} & 1 & 1 \\ C_{21} & S_2 & S_2 & 1 & 0 \\ C_{21} & S_2 & S_2 & 0 & 1 \\ 1 & 1 & 0 & 0 & 0 \\ 1 & 0 & 1 & 0 & 0 \end{pmatrix} \begin{pmatrix} a[n] \\ b_1[n] \\ b_2[n] \\ c_1[n] \\ c_2[n] \end{pmatrix} \quad (6)$$

where $S_1$ and $S_2$ define the degree of audio feedback applied to calls using either analog phone line or the SBP handset, and $C_{12}$ and $C_{21}$ are the mixing coefficients. One skilled in the art will appreciate that the multi-line interface illustrated in the SBP 2300 is one example of a multi-line phone. The multi-line interfaces may also be adapted to operatively couple a phone to multiple SBP handsets and to multiple SIP sessions, for example. Similarly, the various forms of multi-line interfaces may be employed in any of the IP bridge phones described above in the preceding embodiments, including but not limited to the SBP, WSBP, SBPS, and SBM The various embodiments described above may be constructed by one skilled in the art using one or more application specific integrated circuits (ASICs) and or printed circuit boards (PCBs) adapted for insertion into the cavity of a digit phone, for example. The ASICs and or PCBs are sometimes referred to as "plugware" and may be used to provide IP functionality, SIP bridge functionality, and wireless network capability to a digital phone, thereby converting the digital phone to a SBP or a WSBP, for example.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

We claim:

1. An IP bridge phone in a data communications network, the IP bridge phone comprising:
   a plurality of interfaces comprising:
      an audio user interface;
      an analog phone interface adapted to connect to at least one analog phone;
      a network interface adapted to connect to the data communications network;
   a mixing module adapted to:
      receive a first voice signal from the audio user interface, a second voice signal from the at least one analog phone, and a third voice signal from the data communications network;
      generate a plurality of combined signals from the first voice signal, the second voice signal, and the third voice signal; and
      transmit each of the plurality of combined signals to one of the plurality of interfaces;
   wherein the audio user interface and at least one analog phone are in parallel communication; and
   wherein the IP bridge phone is adapted to:
      if a session request to establish an incoming call is received from the network interface:
         cause the IP bridge phone to ring, and
         transmit a ring signal to the at least one analog phone
      if an off-hook signal is received by the audio user interface or the analog phone interface:
         cause the IP bridge phone to discontinue the ring;
         terminate the ring signal to the at least one analog phone; and
         transmit a session acceptance message to establish a voice-over-IP session; and
   wherein the plurality of combined signals comprises, if off-hook signals are received by the audio user interface and the analog phone interface:
      a first combined signal, transmitted to the audio user interface, comprising the second voice signal and third voice signal;
      a second combined signal, transmitted to the analog phone interface, comprising the first voice signal and the third voice signal; and
      a third voice signal, transmitted to the network interface, comprising the first voice signal and the second voice signal.

2. The IP bridge phone of claim 1, wherein the IP bridge phone is further adapted to:
   transmit a ring signal to the at least one analog phone if an incoming connection request is received from the data communications network, and
   terminate the ring signal to the at least one analog phone if an off-hook signal is received by either the audio user interface or the at least one analog phone.

3. The IP bridge phone of claim 1, wherein the audio user interface is a phone handset interface comprising:
   a first analog-to-digital converter for digitizing the first voice signal, and
   a first digit-to-analog converter for outputting one of the plurality of combined signals to transmit to a phone handset.

4. The IP bridge phone of claim 1, wherein the third voice signal comprises packetized voice data.

5. The IP bridge phone of claim 4, wherein the bridge phone is enabled with a Real-Time Protocol (RIP) for communicating the packetized voice data.

6. The IP bridge phone of claim 1, wherein the network interface comprises an Ethernet port.

7. The IP bridge phone of claim 1, wherein the network interface further comprises a wireless adaptor for communicating with the data communications network via a wireless access point.

8. The IP bridge phone of claim 1, wherein the first combined signal A[n], the second combined signal B[n], and the third combined signal C[n] are given by:

$$\begin{pmatrix} A[n] \\ B[n] \\ C[n] \end{pmatrix} = \begin{pmatrix} S_1 & C_{12} & 1 \\ C_{21} & S_2 & 1 \\ 1 & 1 & 0 \end{pmatrix} \begin{pmatrix} a[n] \\ b[n] \\ c[n] \end{pmatrix},$$

where the first voice signal a[n], the second voice signal b[n], and the third voice signal c[n] are functions of a discrete unit if time given by n, $S_1$ and $S_2$ are side-tone levels, and $C_{12} C_{21}$ are cross-coupling coefficients.

9. The IP bridge phone of claim 1, wherein the established voice-over-IP session is terminated by the IP bridge phone when on-hook signals are received by the audio user interface and from each of the at least one analog phone.

10. The IP bridge phone of claim 4, wherein the session request is a SIP: INVITE message, the session acceptance message is a SIP: OK message, and the established voice-over-IP session is terminated is terminated with a SIP: BYE message.

11. An IP bridge phone in a data communications network, the IP bridge phone comprising:
   a plurality of interfaces comprising:
      an audio user interface;
      an analog phone interface adapted to connect to at least one analog phone, wherein the analog phone interface comprises a RJ-11 telephone jack and a Subscriber Line Interface Circuit (SLIC) adapted to perform ring generation, off hook detection, on-hook detection for the at least one analog phone;
      a network interface adapted to connect to the data communications network;
   a mixing module adapted to:
      receive a first voice signal from the audio user interface, a second voice signal from the at least one analog phone, and a third voice signal from the data communications network;
      generate a plurality of combined signals from the first voice signal, the second voice signal, and the third voice signal; and
      transmit each of the plurality of combined signals to one of the plurality of interfaces;
   wherein the audio user interface and at least one analog phone are in parallel communication; and
   wherein the analog phone interface further comprises:

a second analog-to-digital converter for digitizing the second voice signal; and
a second digit-to-analog converter to output one of the plurality of combined signals to transmit to the at least one analog phone.

12. An IP bridge phone in a data communications network, the IP bridge phone comprising:
a plurality of interfaces comprising:
an audio user interface;
an analog phone interface adapted to connect to at least one analog phone; a network interface adapted to connect to the data communications network;
a mixing module adapted to:
receive a first voice signal from the audio user interface, a second voice signal from the at least one analog phone, and a third voice signal from the data communications network;
generate a plurality of combined signals from the first voice signal, the second voice signal, and the third voice signal; and
transmit each of the plurality of combined signals to one of the plurality of interfaces;
wherein the audio user interface and at least one analog phone are in parallel communication
wherein the IP bridge phone is enabled with a Session Initiation Protocol (SIP) to establish a communications session between the IP bridge phone and a source of the third voice signal,
wherein the network interface comprises:
a speech decompression module for decompressing packetized voice data received by the IP bridge phone, and
a speech compression module for compressing one of the plurality of combined signals transmitted to the network interface by the IP bridge phone.

13. An IP bridge phone in a data communications network, the IP bridge phone comprising:
a plurality of interfaces comprising:
an audio user interface;
an analog phone interface adapted to connect to at least one analog phone;
a network interface adapted to connect to the data communications network;
a mixing module adapted to:
receive a first voice signal from the audio user interface, a second voice signal from the at least one analog phone, and a third voice signal from the data communications network;
generate a plurality of combined signals from the first voice signal, the second voice signal, and the third voice signal; and
transmit each of the plurality of combined signals to one of the plurality of interfaces;
wherein the audio user interface and at least one analog phone are in parallel communication;
wherein the IP bridge phone is adapted to:
transmit a session request to a called party from the network interface in response to an off-hook received by the audio user interface or from the at least one analog phone; and
establish a voice-over-IP session, if a session acceptance message is received from the called party;
wherein the combined signals transmitted during the established voice-over-IP session comprise, if an off hook has been received at the audio user interface and an off-hook has been received from the at least one analog phone:
a first combined signal transmitted by the IP bridge phone to the audio user interface and a second combined signal transmitted by the IP bridge phone to the analog phone interface; and
wherein the plurality of combined signals comprise, if the audio user interface and one of the at least one analog phone are off hook:
the first combined signal comprising the second voice signal and third voice signal;
the second combined signal comprising the first voice signal and the third voice signal; and
a third voice signal comprising the first voice signal and the second voice signal.

14. The IP bridge phone of claim 13, wherein the IP bridge further includes a user input device adapted to acquire a telephone number of the called party.

15. The IP bridge phone of claim 14, wherein the IP bridge phone is adapted to receive a telephone number of the called party from the at least one analog phone via the analog phone interface.

16. The IP bridge phone of claim 13, wherein the established voice-over-IP session is maintained by the IP bridge phone while the audio user interface or one of the at least one analog phone is off-hook.

17. The IP bridge phone of claim 13, wherein the established voice-over-IP session is terminated by the IP bridge phone when on-hook signals are received by the audio user interface and each of the at least one analog phone.

18. A method of operating an IP bridge phone in a data communications network in parallel with an analog phone, the method comprising the steps of:
receiving voice signals via a plurality of interfaces, comprising:
receiving a first voice signal from a phone handset via a phone handset interface; wherein the step of receiving the first voice signal comprises converting the first voice signal from analog to digital;
receiving a second voice signal from at least one analog phone via an analog phone interface, wherein the step of receiving the second voice signal comprises converting the second voice signal from analog to digital;
receiving a third voice signal from the data communications network via a network interface;
generating a plurality of combined signals from the first voice signal, the second voice signal, and the third voice signal; and
transmitting each of the plurality of combined signals to one of the plurality of interfaces, wherein the step of transmitting comprises converting a first combined signal of the plurality of combined signals from digital to analog;
wherein the phone handset and at least one analog phone are in parallel communication.

19. The method of claim 18, wherein the analog phone interface comprises a telephone jack.

20. The method of claim 19, wherein the telephone jack is an RJ-11 jack.

21. The method of claim 20, wherein the analog phone interface further comprises a Subscriber Line Interface Circuit (SLIC).

22. The method of claim 18, wherein the third voice signal comprises packetized voice data.

23. The method of claim 22, wherein the bridge phone is enabled with a Real-Time Protocol (RIP) for receiving the packetized voice data and transmitting a third combined signal of the plurality of combined signals.

24. The method of claim 18, wherein the method further comprises, prior to receiving voice signals via a plurality interfaces, the steps of:
  receiving an off-hook and telephone number from either the phone handset or the at least one analog phone, and
  automatically transmitting a session request to a called party from the network interface using the telephone number.

25. The method of claim 24, wherein the IP bridge phone is adapted to establish a voice-over-IP session, if a session acceptance message is received from the called party.

26. The method of claim 25, wherein the combined signals transmitted during the established voice-over-IP session comprise, if an off-hook has been received from the phone handset and an off-hook has been received from the at least one analog phone:
  a first combined signal transmitted to the phone handset and a second combined signal transmitted by the IP bridge phone to the analog phone interface.

27. The method of claim 26, wherein the plurality of combined signals comprise, if the phone handset and one of the at least one analog phone are off-hook:
  the first combined signal comprising the second voice signal and third voice signal;
  the second combined signal comprising the first voice signal and the third voice signal; and
  a third voice signal comprising the first voice signal and the second voice signal.

28. The method of claim 26, wherein the established voice-over-IP session is maintained by the IP bridge phone while the phone handset or one of the at least one analog phone is off-hook.

29. A method of operating an Session Initiation Protocol (SIP) bridge phone in a data communications network in parallel with an analog phone, the method comprising the steps of:
  receiving voice signals via a plurality of interfaces, comprising:
    receiving a first voice signal from a phone handset via a phone handset interface;
    receiving a second voice signal from at least one analog phone via an analog phone interface;
    establishing a communications session between the SIP bridge phone and a source of a third voice signal
    receiving the third voice signal from the data communications network via a network interface, wherein the step of receiving the third voice signal comprises decompressing the third voice signal;
  generating a plurality of combined signals from the first voice signal, the second voice signal, and the third voice signal; and
  transmitting each of the plurality of combined signals to one of the plurality of interfaces, wherein the step of transmitting further comprises the step of compressing a third combined signal of the plurality of combined signals transmitted to the data communications network via the network interface; and
  wherein the phone handset and at least one analog phone are in parallel communication.

30. A method of operating an IP bridge phone in a data communications network in parallel with an analog phone, the method comprising the steps of:
  receiving voice signals via a plurality of interfaces, comprising:
    receiving a first voice signal from a phone handset via a phone handset interface;
    receiving a second voice signal from at least one analog phone via an analog phone interface;
    receiving a third voice signal from the data communications network via a network interface;
  generating a plurality of combined signals from the first voice signal, the second voice signal, and the third voice signal; and
  transmitting each of the plurality of combined signals to one of the plurality of interfaces; when a session request to establish an incoming call is received via the network interface:
    causing the IP bridge phone to ring, and
    transmitting a ring signal to the at least one analog phone;
  when an off-hook signal is received from the phone handset interface or the analog phone interface, automatically transmitting a session acceptance message to establish a voice-over-IP session; and
  when off-hook signals are received from both the phone handset and the at least one analog phone:
    transmitting a first combined signal comprising the second voice signal and third voice signal to the phone handset via the phone handset interface;
    transmitting a second combined signal comprising the first voice signal and the third voice signal transmitted to the at least one analog phone via the analog phone interface; and
    transmitting a third voice signal comprising the first voice signal and the second voice signal via the network interface.

31. The method of claim 30, wherein the first combined signal A[n], the second combined signal B[n], and the third combined signal C[n] are given by:

$$\begin{pmatrix} A[n] \\ B[n] \\ C[n] \end{pmatrix} = \begin{pmatrix} S_1 & C_{12} & 1 \\ C_{21} & S_2 & 1 \\ 1 & 1 & 0 \end{pmatrix} \begin{pmatrix} a[n] \\ b[n] \\ c[n] \end{pmatrix},$$

where the first voice signal a[n], the second voice signal b[n], and the third voice signal c[n] are functions of a discrete unit if time given by n, $S_1$ and $S_2$ are side-tone levels, and $C_{12}$ and $C_{21}$ are cross-coupling coefficients.

32. The method of claim 30, wherein the session request is a SIP: INVITE message and the session acceptance message is a SIP: OK message.

* * * * *